(12) United States Patent  
Tsukagoshi

(10) Patent No.: US 10,511,802 B2  
(45) Date of Patent: Dec. 17, 2019

(54) TRANSMISSION DEVICE, TRANSMISSION METHOD, REPRODUCING DEVICE AND REPRODUCING METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/757,663

(22) PCT Filed: Sep. 12, 2016

(86) PCT No.: PCT/JP2016/076770  
§ 371 (c)(1),  
(2) Date: Mar. 6, 2018

(87) PCT Pub. No.: WO2017/047540  
PCT Pub. Date: Mar. 23, 2017

(65) Prior Publication Data  
US 2018/0255270 A1  Sep. 6, 2018

(30) Foreign Application Priority Data

Sep. 16, 2015  (JP) .................................. 2015-183476

(51) Int. Cl.  
*H04N 5/92* (2006.01)  
*H04N 21/2362* (2011.01)  
(Continued)

(52) U.S. Cl.  
CPC ........... *H04N 5/9206* (2013.01); *H04N 5/783* (2013.01); *H04N 9/8233* (2013.01);  
(Continued)

(58) Field of Classification Search  
CPC .......... H04N 5/9206; H04N 5/76; H04N 5/92; H04N 7/08; H04N 21/235; H04N 5/783;  
(Continued)

(56) References Cited

U.S. PATENT DOCUMENTS

2010/0129052 A1*  5/2010  Fujinami .............. G11B 27/005  
386/241  
2017/0180767 A1*  6/2017  Oh .................... H04N 21/23614

FOREIGN PATENT DOCUMENTS

JP  2008-193203 A  8/2008  
JP  2010-81149 A  4/2010  
(Continued)

OTHER PUBLICATIONS

International Search Report dated Nov. 8, 2016 in PCT/JP2016/076770 filed Sep. 12, 2016.

*Primary Examiner* — Mishawn N. Hunter  
(74) *Attorney, Agent, or Firm* — Oblon, McClelland, Maier & Neustadt, L.L.P.

(57) ABSTRACT

Subtitles can be satisfactorily displayed at the time of RAP reproduction and at the time of variable-speed reproduction. A video stream that includes a video packet in which a payload has coded image data is generated. A subtitle stream that includes a subtitle packet in which a payload has subtitle information is generated. A multiplexed stream that includes a container packet obtained by packetizing the video stream and the subtitle stream is generated and transmitted. Into a header of a specific container packet in which a payload includes a first byte of the subtitle packet, first identification information indicating that the payload includes the first byte is inserted. For example, this first identification information further indicates a priority of subtitle displaying based on subtitle information contained in the subtitle packet having the first byte included in the payload of the specific container packet.

11 Claims, 18 Drawing Sheets

(51) Int. Cl.
    *H04N 21/434*     (2011.01)
    *H04N 21/235*     (2011.01)
    *H04N 21/4402*     (2011.01)
    *H04N 21/488*     (2011.01)
    *H04N 5/783*     (2006.01)
    *H04N 9/82*     (2006.01)

(52) U.S. Cl.
    CPC ....... *H04N 21/235* (2013.01); *H04N 21/2362* (2013.01); *H04N 21/434* (2013.01); *H04N 21/4343* (2013.01); *H04N 21/4348* (2013.01); *H04N 21/440281* (2013.01); *H04N 21/4884* (2013.01)

(58) Field of Classification Search
    CPC ............. H04N 9/8233; H04N 21/2362; H04N 21/434; H04N 21/4343; H04N 21/4348; H04N 21/440281; H04N 21/4884
    See application file for complete search history.

(56) References Cited

FOREIGN PATENT DOCUMENTS

| | | |
|---|---|---|
| JP | 2012-70344 A | 4/2012 |
| JP | 2012-169885 A | 9/2012 |
| WO | 2011/121318 A1 | 10/2011 |

* cited by examiner

FIG. 3

TTML STRUCTURE

```
<tt xml:lang="" xmlns="http://www.w3.org/ns/ttml">
  <head>
    <metadata/>
    <styling/>
    <layout/>
  </head>
  <body/>
</tt>
```

FIG. 4

TTML Metadata (TTM)

(a)
```
<metadata xmlns:ttm="http://www.w3.org/ns/ttml#metadata">
    <ttm:title>Timed Text TTML Example</ttm:title>
    <ttm:copyright>The Authors (c) 2006</ttm:copyright>
</metadata>
```

TTML Styling (TTS)

(b)
```
<styling xmlns:tts="http://www.w3.org/ns/ttml#styling">
    <!-- s1 specifies default color, font, and text alignment -->
    <style xml:id="s1"
        tts:color="white"
        tts:fontFamily="proportionalSansSerif"
        tts:fontSize="22px"
        tts:textAlign="center"
    />
    <!-- alternative using yellow text but otherwise the same as style s1 -->
    <style xml:id="s2" style="s1" tts:color="yellow"/>
    <!-- a style based on s1 but justified to the right -->
    <style xml:id="s1Right" style="s1" tts:textAlign="end" />
    <!-- a style based on s2 but justified to the left -->
    <style xml:id="s2Left" style="s2" tts:textAlign="start" />
</styling>
```

TTML Layout ( region )

(c)
```
<layout xmlns:tts="http://www.w3.org/ns/ttml#styling">
    <region xml:id="subtitleArea"
        style="s1"
        tts:extent="560px 62px"
        tts:padding="5px 3px"
        tts:backgroundColor="black"
        tts:displayAlign="after"
    />
</layout>
```

FIG. 5

(a)
TTML Body
```
<body region="subtitleArea">
        <p xml:id="subtitle1" begin="0.76s" end="3.45s">
        It seems a paradox, does it not,
        </p>
</body>
```

(b)
TTML Body
```
<body region="subtitleArea">
        <p xml:id="subtitle2" begin="5.0s" end="10.0s">
        that the image formed on<br/>
        the Retina should be inverted?
        </p>
</body>
```

(c)
TTML Body
```
<body region="subtitleArea">
        <p xml:id="subtitle3" begin="10.0s" end="16.0s" style="s2">
        It is puzzling, why is it<br/>
        we do not see things upside-down?
        </p>
</body>
```

FIG. 6

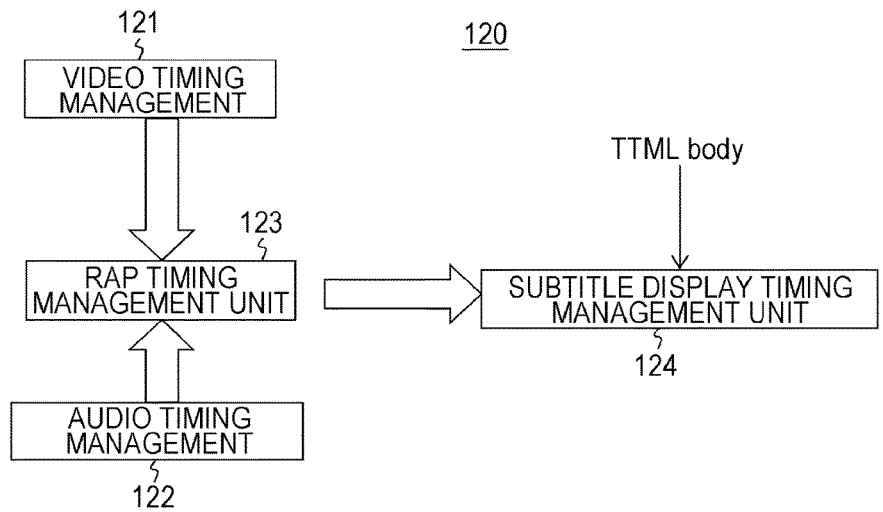

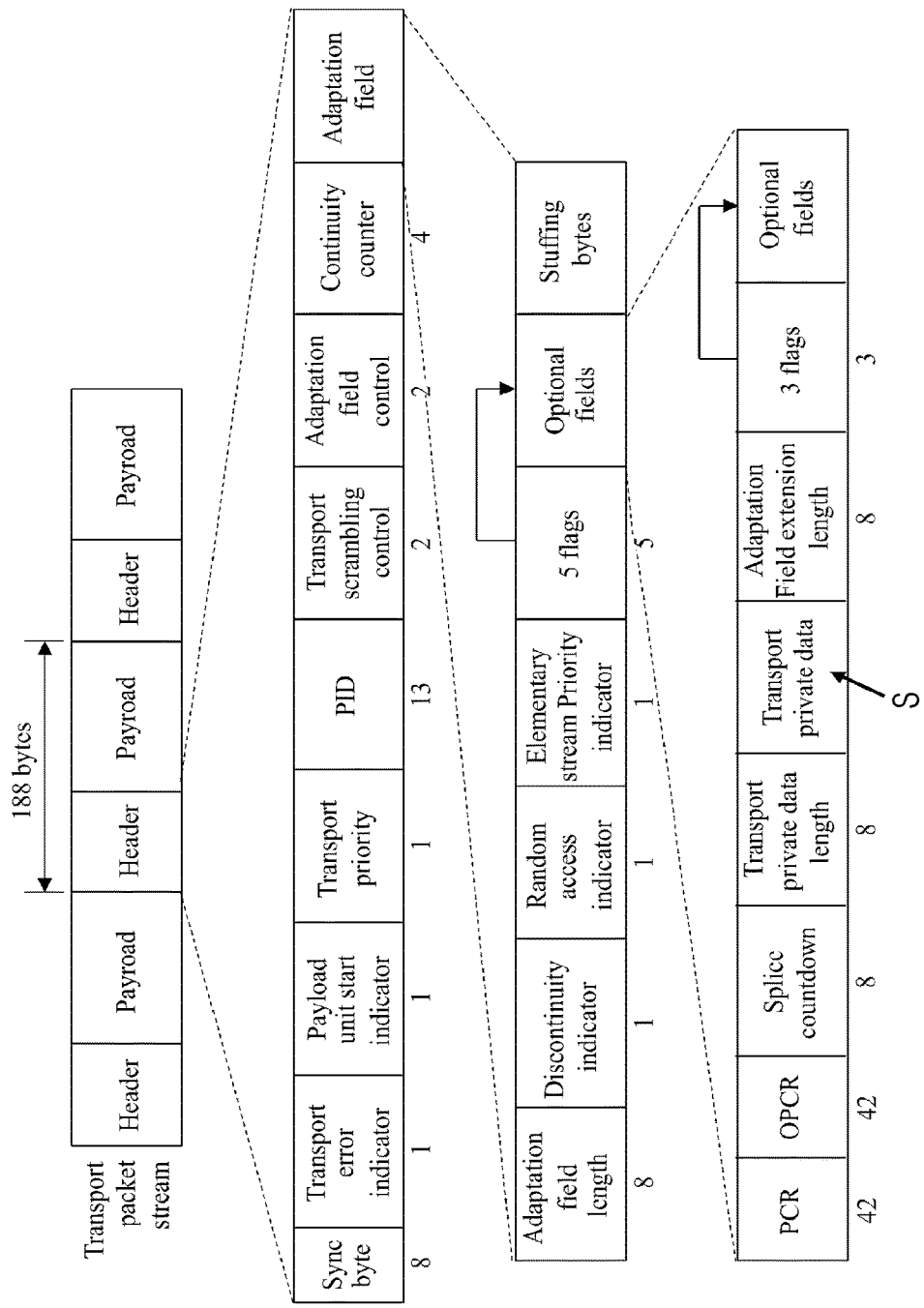

| Syntax | Size | Type |
|---|---|---|
| PVR_assist_information() { | | |
| data_field_tag | 8 | uimsbf |
| data_field_length | 8 | uimsbf |
| PVR_priority_value | 8 | uimsbf |
| } | | |

(b)

data_field_tag = 0x08 (non 0x02)   INDICATE BEING RELATED TO DISPLAYING OF SUBTITLE.

PVR_priority_value (8bits)   INDICATE DISPLAY PRIORITY OF SUBTITLE. IS USED TO DETERMINE WHETHER OR NOT TO PERFORM DECODE DISPLAYING IN RELATION TO REPRODUCTION SPEED WITH INCREASE IN VALUE, DEGREE OF DISPLAYING BECOMES LARGER

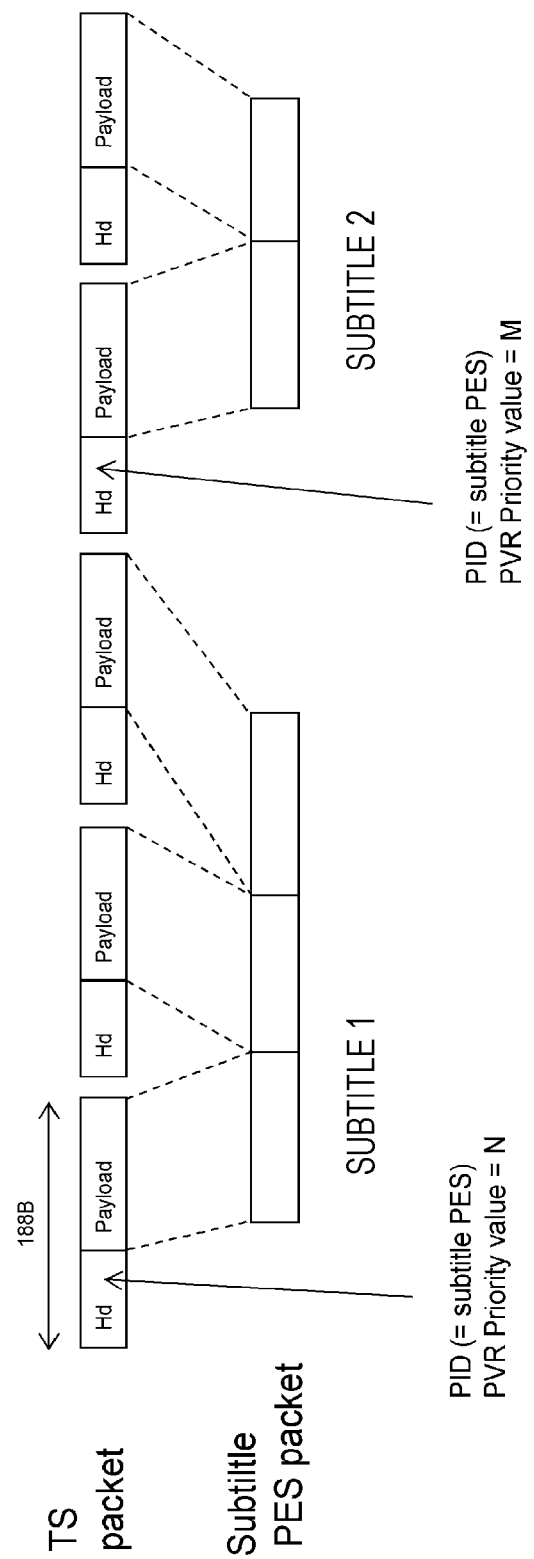

| Syntax | Size | Type |
|---|---|---|
| Subtitle_rap_descriptor() { | | |
| descriptor_tag | 8 | uimsbf |
| descriptor_length | 8 | uimsbf |
| playback_information_insertion_type | 2 | bslbf |
| reserved | 6 | 0xf |
| } | | |

(b)

playback_informetion_insertion_type (2bits) INDICATE INSERT DESTINATION OF SUBTITLE DISPLAY INFORMATION OF PVR TRICK REPRODUCTION.

"01" INDICATE DEFINING IN PES header extension PART
"10" INDICATE DEFINING IN PES payload
"00" INDICATE DEFINING IN Transport private data OF TS adaptation field

| SUBTITLE | PVR_priority_value |
|---|---|
| SUBTITLE 1 | 4 |
| SUBTITLE 2 | 1 |
| SUBTITLE 3 | 2 |

(b)

| PVR_priority_value | DISPLAYING AT THE TIME OF NORMAL REPRODUCTION | DISPLAYING AT DOUBLE-SPEED | DISPLAYING AT QUAD-SPEED |
|---|---|---|---|
| 4 | DISPLAY | DISPLAY | DISPLAY |
| 2 | DISPLAY | DISPLAY | NOT DISPLAY |
| 1 | DISPLAY | NOT DISPLAY | NOT DISPLAY |

FIG. 20

TTML Body

```
<body region="subtitleArea">
    <div>
        <p xml:id="subtitle1" begin="0.76s" end="3.45s">
        It seems a paradox, does it not,
        </p>
        <p xml:id="subtitle2" begin="5.0s" end="10.0s">
        that the image formed on<br/>
        the Retina should be inverted?
        </p>
        <p xml:id="subtitle3" begin="10.0s" end="16.0s" style="s2">
        It is puzzling, why is it<br/>
        we do not see things upside-down?
        </p>
    </div>
</body>
```

| Syntax | Size | Type |
|---|---|---|
| PVR_assist_information() { | | |
|   data_field_tag | 8 | uimsbf |
|   data_field_length | 8 | uimsbf |
|   number_of_subtitles | 8 | uimsbf |
|   for (I = 0; I < number_of_subtitles ; I++){ | | |
|     xml_id | 8 | uimsbf |
|     PVR_priority_value | 8 | uimsbf |
|   } | | |
| } | | |

(b)

data_field_tag = 0x08 (non 0x02)    INDICATE BEING RELATED TO DISPLAYING OF SUBTITLE.

number_of_subtitles (8bits)    INDICATE THE NUMBER OF SUBTITLES.

xml_id (8bits)    INDICATE ID OF SUBTITLE.

PVR_priority_value (8bits)    INDICATE DISPLAY PRIORITY OF SUBTITLE. IS USED TO DETERMINE WHETHER OR NOT TO PERFORM DECODE DISPLAYING IN RELATION TO REPRODUCTION SPEED WITH INCREASE IN VALUE, DEGREE OF DISPLAYING BECOMES LARGER

TRANSMISSION DEVICE, TRANSMISSION METHOD, REPRODUCING DEVICE AND REPRODUCING METHOD

TECHNICAL FIELD

The present technology relates to a transmission device, a transmission method, a reproducing device and a reproducing method, and in particular relates to a transmission device or the like for transmitting subtitle information together with image data.

BACKGROUND ART

Conventionally, for example, in broadcasting of Digital Video Broadcasting (DVB) or the like, the operation of transmitting subtitle information by use of bitmap data is performed. Recently, it is proposed that subtitle information is transmitted by use of text character codes, in other words, on the basis of texts. In this case, font expansion corresponding to a resolution is performed on the receiving side.

In addition, it is proposed that in a case where subtitle information is transmitted on the basis of texts, text information is provided with timing information. As this text information, Timed Text Markup Language (TTML) is proposed in, for example, World Wide Web Consortium (W3C) (refer to Patent Document 1).

CITATION LIST

Patent Document

Patent Document 1: Japanese Patent Application Laid-Open No. 2012-169885

SUMMARY OF THE INVENTION

Problems to be Solved by the Invention

An object of the present technology is to enable to satisfactorily display subtitles at the time of RAP reproduction and at the time of variable-speed reproduction.

Solutions to Problems

A concept of the present technology lies in a transmission device including:
a video encoding unit for generating a video stream that includes a video packet in which a payload has coded image data;
a subtitle encoding unit for generating a subtitle stream that includes a subtitle packet in which a payload has subtitle information;
a multiplexed stream generation unit for generating a multiplexed stream that includes a container packet obtained by packetizing the video stream and the subtitle stream;
a transmission unit for transmitting the multiplexed stream; and
an information insertion unit for inserting, into a header of a specific container packet in which a payload includes a first byte of the subtitle packet, first identification information indicating that the payload includes the first byte.

In the present technology, the video encoding unit generates a video stream that includes a video packet in which a payload has coded image data. The subtitle encoding unit generates a subtitle stream that includes a subtitle packet in which a payload has subtitle information. For example, the subtitle information may be text information of a subtitle that is in a predetermined format, and that has display timing information.

The multiplexed stream generation unit generates a multiplexed stream that includes a container packet obtained by packetizing the video stream and the subtitle stream. For example, the multiplexed stream may be an MPEG-2 transport stream, an MMT stream or a DASH/ISOBMFF stream. The information insertion unit inserts, into a header of a specific container packet in which a payload includes a first byte of the subtitle packet, first identification information indicating that the payload includes the first byte. The transmission unit transmits the multiplexed stream.

In this manner, in the present technology, into a header of a specific container packet in which a payload includes a first byte of the subtitle packet, first identification information indicating that the payload includes the first byte is inserted. Therefore, for example, at the time of RAP reproduction, the container packet in which the payload includes the first byte of the subtitle packet can be easily recognized on the basis of this first identification information. Therefore, a series of container packets including data of the subtitle packet can be efficiently extracted, which enables to satisfactorily display the subtitle.

In addition, in the present technology, for example, the first identification information may be configured to further indicate a priority of subtitle displaying based on subtitle information contained in the subtitle packet having the first byte included in the payload of the specific container packet. In this case, for example, at the time of variable-speed reproduction, referring to a priority indicated by a first identifier, a subtitle to be displayed can be selected according to the reproduction speed. This enables to easily select a subtitle to be displayed, and to satisfactorily display the subtitle on which intention on the producer side is reflected.

It should be noted that in the present technology, an information insertion unit for inserting second identification information into, for example, a multiplexed stream may be further provided, the second identification information indicating that the first identification information is inserted into the header of the specific container packet. In this case, inserting the second identification information into the multiplexed stream enables to easily determine that the first identification information is inserted into the header of the specific container packet.

Additionally, in the present technology, for example, the multiplexed stream generation unit may be configured to arrange the subtitle packet at a random access position. In this case, when a video packet at a random access position is taken out from a multiplexed stream, a subtitle packet can be taken out together. This enables, for example, simplification of subtitle display processing at the time of RAP reproduction.

In addition, another concept of the present technology lies in a reproducing device including a reproduction processing unit for subjecting, to reproduction processing, a multiplexed stream that includes a container packet obtained by packetizing a video stream that includes a video packet in which a payload has coded image data, and a subtitle stream that includes a subtitle packet in which a payload has subtitle information,
in which:
into a header of a specific container packet in which a payload includes a first byte of the subtitle packet, first identification information indicating that the payload includes the first byte is inserted; and the reproduction processing unit extracts the specific container packet from the multiplexed stream on the basis of the first identification information.

In the present technology, the reproduction processing unit subjects, to reproduction processing, a multiplexed stream that includes a container packet obtained by packetizing the video stream and the subtitle stream. Here, the video stream includes a video packet in which a payload has coded image data. In addition, the subtitle stream includes a subtitle packet in which a payload has subtitle information.

Into a header of a specific container packet in which a payload includes a first byte of the subtitle packet, first identification information indicating that the payload includes the first byte is inserted. The reproduction processing unit extracts the specific container packet from the multiplexed stream on the basis of the first identification information.

In this manner, in the present technology, the specific container packet is extracted from the multiplexed stream on the basis of the first identification information. Therefore, for example, at the time of RAP reproduction, a series of container packets including data of the subtitle packet can be efficiently extracted, which enable to satisfactorily display the subtitle.

It should be noted that in the present technology, for example, the first identification information may be configured to further indicate a priority of subtitle displaying based on the subtitle information contained in the subtitle packet having the first byte included in the payload of the specific container packet, and that the reproduction processing unit may be configured to, when the multiplexed stream is subjected to variable-speed reproduction processing, control, on the basis of the priority information, subtitle displaying based on subtitle information contained in each subtitle packet. In this case, at the time of variable-speed reproduction, a selection of which subtitle to be displayed can be easily made, and subtitle displaying on which intention on the producer side is reflected can be satisfactorily performed.

In addition, a still another concept of the present technology lies in a transmission device including:

a video encoding unit for generating a video stream that includes a video packet in which a payload has coded image data;

a subtitle encoding unit for generating a subtitle stream that includes a subtitle packet in which a payload has subtitle information;

a multiplexed stream generation unit for generating a multiplexed stream that includes a container packet obtained by packetizing the video stream and the subtitle stream;

a transmission unit for transmitting the multiplexed stream; and an information insertion unit for inserting, into a header of a specific container packet in which a payload includes a first byte of the subtitle packet, priority information of subtitle displaying based on the subtitle information contained in the subtitle packet having the first byte.

In the present technology, the video encoding unit generates a video stream that includes a video packet in which a payload has coded image data. The subtitle encoding unit generates a subtitle stream that includes a subtitle packet in which a payload has subtitle information. For example, the subtitle information may be text information of a subtitle that is in a predetermined format, and that has display timing information.

The multiplexed stream generation unit generates a multiplexed stream that includes a container packet obtained by packetizing the video stream and the subtitle stream. For example, the multiplexed stream may be an MPEG-2 transport stream, an MMT stream or a DASH/ISOBMFF stream. The information insertion unit inserts, into a header of a specific container packet in which a payload includes a first byte of the subtitle packet, priority information of subtitle displaying based on the subtitle information contained in the subtitle packet having the first byte. The transmission unit transmits the multiplexed stream.

In this manner, in the present technology, into a header of a specific container packet in which a payload includes a first byte of the subtitle packet, priority information of subtitle displaying based on the subtitle information contained in the subtitle packet having the first byte is inserted. Therefore, for example, at the time of variable-speed reproduction, referring to the priority information, a subtitle to be displayed can be selected according to the reproduction speed. This enables to easily select a subtitle to be displayed, and to satisfactorily display the subtitle on which intention on the producer side is reflected.

In addition, for example, at the time of RAP reproduction, the container packet in which the payload includes the first byte of the subtitle packet can be easily recognized on the basis of this priority information. Therefore, a series of container packets including data of the subtitle packet can be efficiently extracted, which enables to satisfactorily display the subtitle.

Effects of the Invention

According to the present technology, subtitles can be satisfactorily displayed at the time of RAP reproduction and at the time of variable-speed reproduction. It should be noted that the effects described in the present description are to be construed as merely illustrative, and are not limitative, and that, in addition, an additional effect may be produced.

BRIEF DESCRIPTION OF DRAWINGS

FIG. 3 is a drawing illustrating a TTML structure.

FIG. 4 shows drawings of respective structure examples of metadata (metadata), styling (styling) and layout (layout) elements that exist in a header (head) having a TTML structure.

FIG. 5 shows drawings of respective structure examples of bodies (body) each having a TTML structure.

FIG. 6 is a diagram schematically illustrating a configuration example of a timing management unit in a control unit.

FIG. 9 is a diagram illustrating a configuration example of a TS packet.

FIG. 10 shows a structure example of PVR_assist_information (PVR_assist_information), and main information contents in the structure example.

FIG. 11 is a diagram illustrating, as an example, the relationship of subtitle PES packets with TS packets each having a payload that includes data of the subtitle PES packets.

FIG. 12 shows a structure example of Subtitle_rap_descriptor (Subtitle_rap_descriptor), and main information contents in the structure example.

FIG. 17 shows tables illustrating, as an example, a correspondence relationship between a value of "PVR_priority_value" added to a subtitle, and the subtitle displayed at each reproduction speed, that is, normal speed, double speed and quad speed.

FIG. 20 is a drawing illustrating another structure example of a body (body) having a TTML structure.

FIG. 21 shows another structure example of PVR_assist_information (PVR_assist_information), and main information contents in the structure example.

MODE FOR CARRYING OUT THE INVENTION

Modes for carrying out the invention (hereinafter referred to as embodiment) will be described below. It should be noted that explanations are made in the following order.
1. Embodiment
2. Modified example

1. Embodiment

Configuration Example of Transmitting and Receiving System

Figure 1:
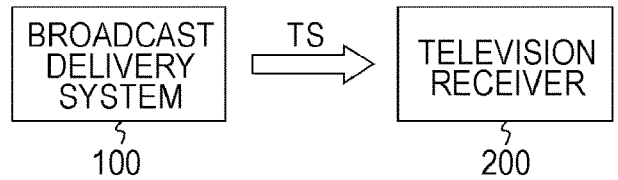
FIG. 1 is a block diagram illustrating a configuration example of a transmitting and receiving system as an embodiment.

FIG. 1 illustrates a configuration example of a transmitting and receiving system 10 as an embodiment. This transmitting and receiving system 10 includes a broadcast delivery system 100, and a television receiver 200. The broadcast delivery system 100 transmits a MPEG-2 transport stream (hereinafter merely referred to as "transport stream") TS, which is a multiplexed stream, on a broadcast wave. The transport stream TS has not only a video stream and an audio stream, but also a subtitle stream.

The video stream includes a video PES packet in which a payload has coded image data. The audio stream includes an audio PES packet in which a payload has coded audio data. The subtitle stream includes a subtitle PES packet in which a payload has subtitle (subtitle) information. A time stamp having a value that is the same as or close to a value of a time stamp inserted at a time-stamp insertion position of a header of a video PES packet at a random access position is inserted at a time-stamp insertion position of a header of the subtitle PES packet.

When a subtitle stream is multiplexed with a video stream or the like, a TS packet including a subtitle PES packet (hereinafter merely referred to as PES packet) is arranged at a random access position. In this case, for example, as described above, the time stamp inserted at the time-stamp insertion position of the header is referred to, and the subtitle PES packet is arranged at a random access position, in other words, at a position that is close to a position of the video PES packet at the random access position.

The transport stream TS includes a TS packet that is a container packet obtained by packetizing each of a video stream, an audio stream and a subtitle stream. Into a header of a TS packet (specific container packet) in which a payload includes a first byte of a subtitle PES packet, first identification information indicating that the payload includes the first byte is inserted. This first identification information further indicates a priority of subtitle displaying based on subtitle information contained in a subtitle packet having the first byte. Second identification information indicating that the first identification information is inserted into the header of the specific container packet is inserted into the transport stream TS.

The television receiver 200 receives the transport stream TS transmitted from the broadcast delivery system 100 through a broadcast wave. As described above, this transport stream TS includes a TS packet obtained by packetizing each of a video stream, an audio stream and a subtitle stream.

As described above, when the transport stream TS is multiplexed, the subtitle PES packet is arranged at a random access position. In addition, as described above, into a header of a TS packet (specific container packet) in which a payload includes a first byte of the subtitle PES packet, first identification information indicating that the payload includes the first byte is inserted. Moreover, this first identification information further indicates a priority of subtitle displaying based on subtitle information contained in a subtitle packet having the first byte.

The television receiver 200 extracts the subtitle PES packet from the transport stream TS together with the video PES packet at the random access position, and then performs subtitle (subtitle) display processing. For example, at the time of RAP reproduction, a subtitle PES packet extracted from the transport stream TS at a random access position is immediately processed to display a subtitle.

In this case, the television receiver 200 is capable of easily identifying the specific container packet, in other words, the TS packet in which the payload includes the first byte of the subtitle packet, on the basis of the first identification information. Therefore, a series of TS packets related to the subtitle PES packet having the subtitle information can be efficiently extracted, which enables to satisfactorily display the subtitle.

In addition, for example, at the time of variable-speed reproduction, the television receiver 200 refers to a priority of subtitle displaying indicated by a first identifier, and selects a subtitle, which is to be displayed, according to a reproduction speed. This enables the television receiver 200 to easily select a subtitle to be displayed, and to satisfactorily display the subtitle on which intention on the producer side is reflected.

Configuration Example of Stream Generation Unit of Broadcast Delivery System

Figure 2:
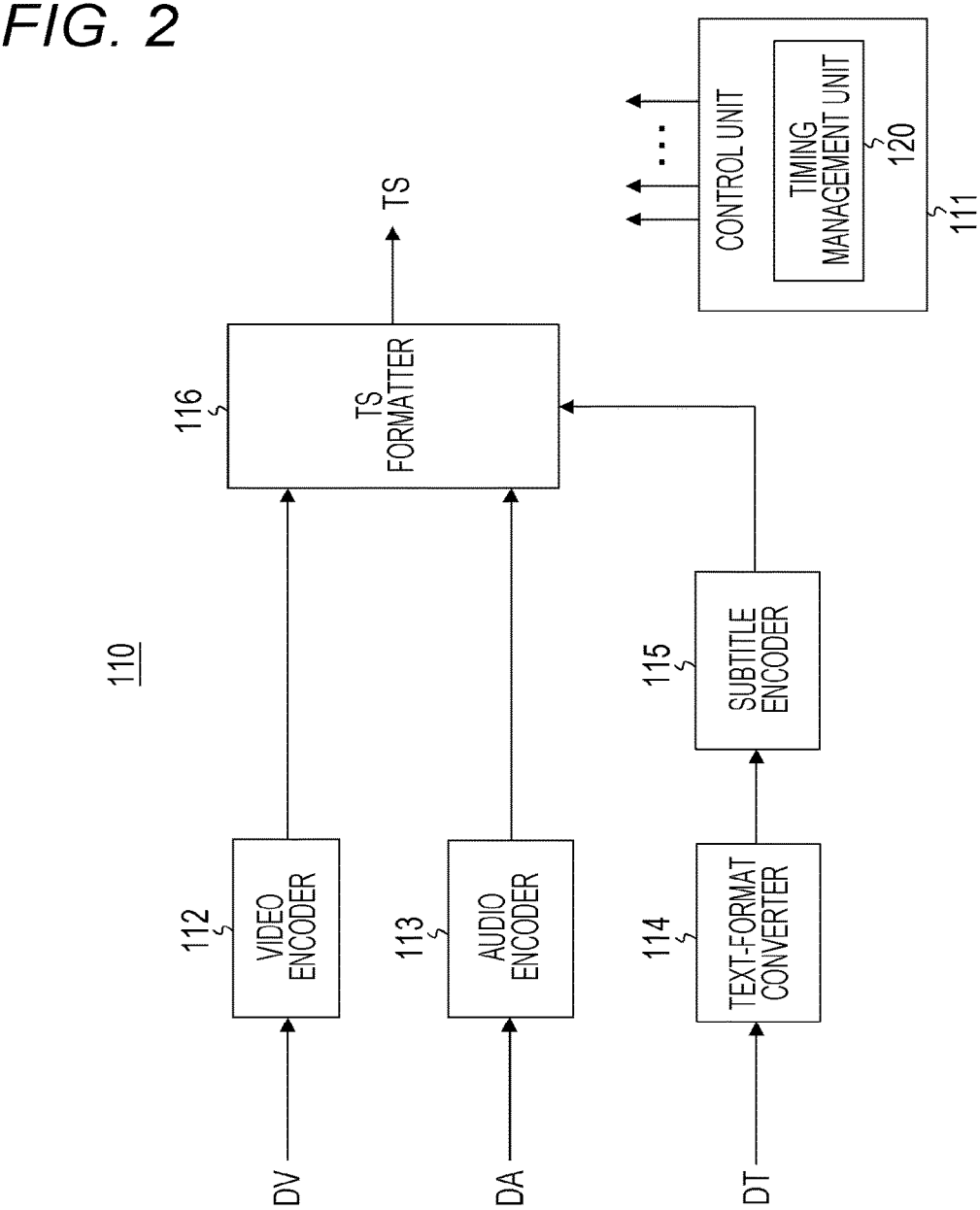
FIG. 2 is a block diagram illustrating a configuration example of a stream generation unit of a broadcast delivery system.

FIG. 2 illustrates a configuration example of a stream generation unit 110 of the broadcast delivery system 100. This stream generation unit 110 includes a control unit 111, a video encoder 112, an audio encoder 113, a text-format converter 114, a subtitle encoder 115, and a TS formatter (multiplexer) 116.

The control unit 111 includes, for example, a Central Processing Unit (CPU), and controls the operation of each component of the stream generation unit 110. The video encoder 112 inputs image data DV, subjects this image data DV to coding, and generates a video stream (PES stream) that includes a video PES packet in which a payload has coded image data. The audio encoder 113 inputs audio data DA, subjects this audio data DA to coding, and generates an audio stream (PES stream) that includes an audio PES packet having coded audio data.

The text-format converter 114 inputs text data (character code) DT as subtitle information, and obtains text information of a subtitle that is in a predetermined format, and that has display timing information. As this text information, for example, TTML or a TTML derived format is considered to be used. However, it is assumed that TTML is used in this embodiment.

FIG. 3 shows a TTML structure. TTML is described on the basis of XML. A header (head) includes metadata (metadata), styling (styling) and layout (layout) elements. FIG. 4(a) shows a structure example of metadata (TTM: TTML Metadata). This metadata includes metadata title information, and copyright information.

FIG. 4(b) shows a structure example of styling (TTS: TTML Styling). Other than the identifier (id), this styling includes information such as color (color), font (font Family), size (font Size) and alignment (text Align). FIG. 4(c) shows a structure example of layout (region: TTML layout). Other than an identifier (id) of a region in which a subtitle is arranged, this layout includes information such as extent (extent), offset (padding), background color (background Color), and alignment (display Align).

FIGS. 5(a), 5(b), 5(c) each show a structure example of body (body). In an example shown in FIG. 5(a), information of subtitle 1 (subtitle 1) is included. In an example shown in FIG. 5(b), information of subtitle 2 (subtitle 2) is included. In an example shown in FIG. 5(c), information of subtitle 3 (subtitle 3) is included. As information of each subtitle, display start timing and display end timing are described, and text data is described. For example, with respect to the subtitle 1 (subtitle 1), the display start timing is "0.76 s", the display end timing is "3.45 s", and text data is "It seems a paradox, dose it not,".

Returning to FIG. 2, the subtitle encoder 115 converts TTML obtained by the text-format converter 114 into various kinds of segments, and generates a subtitle stream (PES stream) that includes a subtitle PES packet having a payload in which those segments (subtitle information) are arranged. In this case, taking bodies of FIGS. 5(a), 5(b), 5(c) as an example, subtitle PES packets that include information of bodies respectively are generated.

Under the control of the control unit 111, the subtitle encoder 115 inserts, at the time-stamp insertion position of the header of the subtitle PES packet, a time stamp (first time stamp) having a value that is the same as or close to a value of the time stamp inserted at the time-stamp insertion position of the header of the video PES packet at the random access position, in other words, the video PES packet targeted for RAP (Random Access Point).

Here, it means that a head part of the video PES packet targeted for RAP is, for example, a head part of a video PES packet in which a payload has coded image data of an intra-picture (I picture). At the time of so-called RAP reproduction, only coded image data of the intra-picture included in the video PES packet targeted for RAP is decoded from the transport stream TS, and is then image-displayed. In addition, at the time of other variable-speed reproductions, coded image data of a picture that is included in an intermittent partial video PES packet corresponding to the double speed including the video PES packet targeted for RAP is decoded, and is then image-displayed.

In addition, under the control of the control unit 111, the subtitle encoder 115 inserts a specific time stamp (second time stamp) indicating the display time (the display start time, the display end time) of a subtitle into the header or payload of the subtitle PES packet.

FIG. 6 schematically illustrates a configuration example of a timing management unit 120 in the control unit 111. This timing management unit 120 includes a video timing management unit 121, an audio timing management unit 122, an RAP timing management unit 123, and a subtitle display timing management unit 124.

The video timing management unit 121 manages a time stamp (a time stamp of an access unit of video) that should be inserted at a time-stamp insertion position of each video PES packet. The video encoder 112 inserts a time stamp at the time-stamp insertion position of each video PES packet on the basis of management information of this video timing management unit 121.

The audio timing management unit 122 manages a time stamp (a time stamp of an access unit of audio) that should be inserted at a time-stamp insertion position of each audio PES packet. The audio encoder 113 inserts a time stamp at the time-stamp insertion position of each audio PES packet on the basis of management information of this audio timing management unit 122.

The RAP timing management unit 123 manages the time stamp of the video PES packet targeted for RAP, and among audio PES packets, an audio PES packet targeted for RAP is managed. In this case, an audio PES packet having a time stamp that is close to the time stamp of the video PES packet targeted for RAP is treated as a reproduction target at the time of RAP.

On the basis of the management information of this audio PES packet targeted for RAP, the TS formatter 116 performs arrangement at a position at which the audio PES packet targeted for RAP is close to a random access position, that is to say, a position of the video PES packet targeted for RAP as described later.

The subtitle display timing management unit 124 manages the first time stamp (the time stamp inserted into the time stamp insertion area of the header) and the second time stamp (the specific time stamp indicating the display time of the subtitle to be inserted into the header or the payload) of the subtitle PES packet. The subtitle encoder 115 inserts the first time stamp and the second time stamp into the subtitle PES packet on the basis of management information of this subtitle display timing management unit 124.

Figure 7:
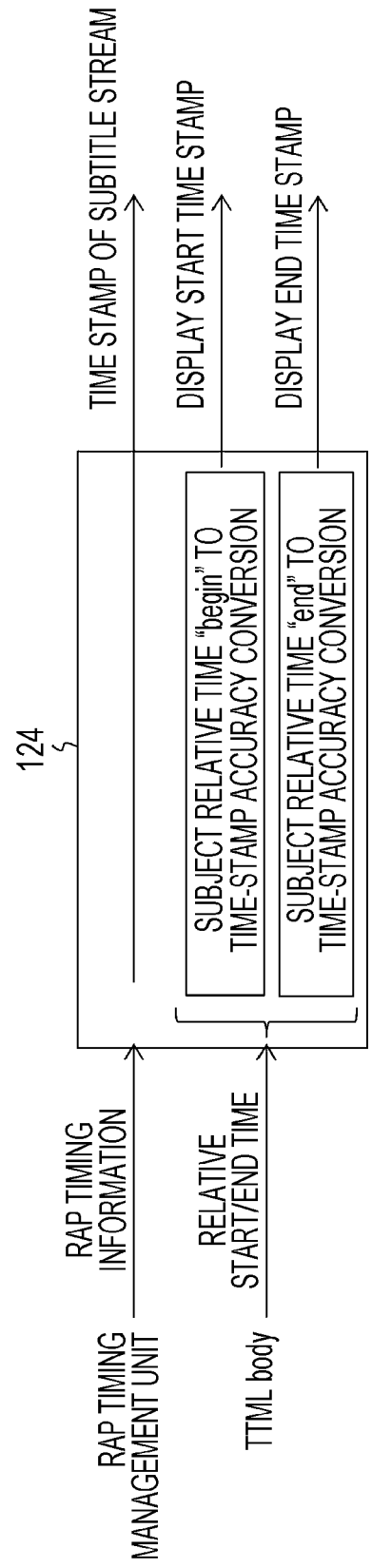
FIG. 7 is a drawing illustrating a detailed configuration of a subtitle display timing management unit.

FIG. 7 illustrates a detailed configuration of the subtitle display timing management unit 124. The subtitle display timing management unit 124 obtains the first time stamp (the time stamp of the subtitle stream) on the basis of RAP timing information from the RAP timing management unit 123. In addition, the subtitle display timing management unit 124 subjects the relative start time "begin" and the relative end time "end" included in the TTML body to time stamp accuracy conversion, and obtains the second time stamp (the display start time stamp, the display end time stamp).

Insertion Position of Second Time Stamp (Subtitle Specific Display Time Stamp)

Figure 8:
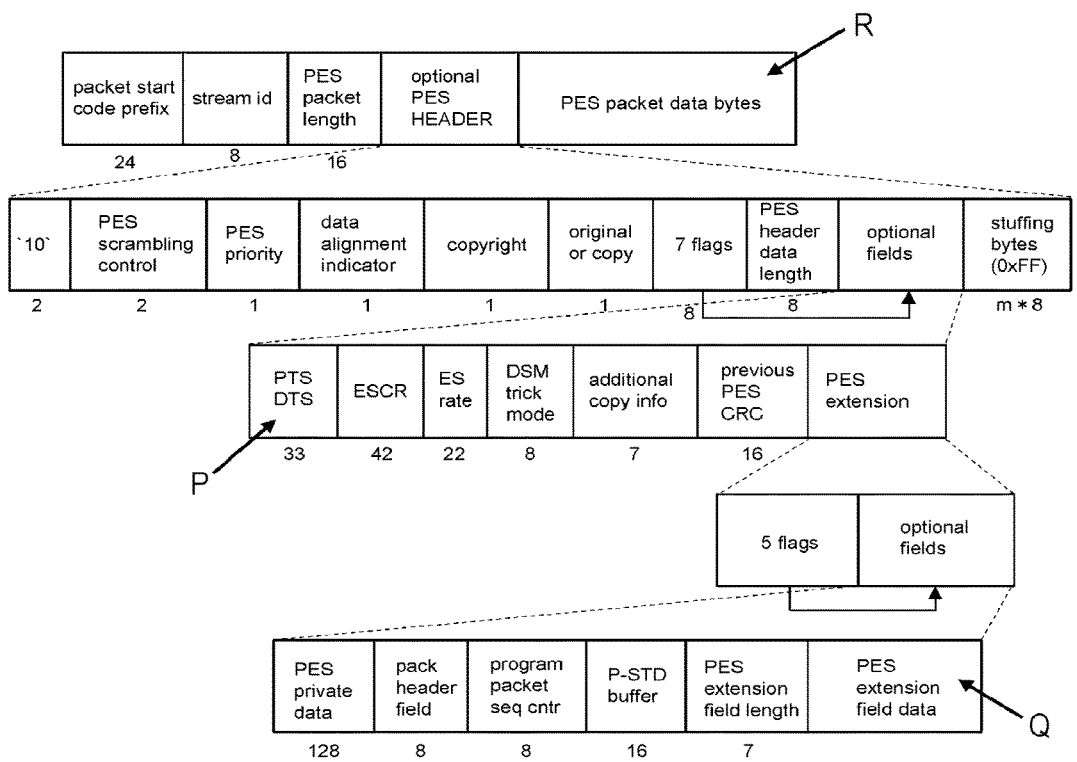
FIG. 8 is a diagram illustrating a configuration example of a PES packet.

Here, a specific example of an insertion position of the second time stamp (subtitle specific display time stamp) will be described. FIG. 8 illustrates a configuration example of a PES packet. The first time stamp is inserted into a 33-bit area that is indicated with an arrow P, and that is a time stamp insertion area of a header. This time stamp insertion area exists in "optional fields" under "optional PES HEADER" that constitutes a part of the header.

The second time stamp is inserted into the header or the payload as described above. In a case where the second time stamp is inserted into the header, the second time stamp is inserted into, for example, an area of "PES extension fields data" indicated with an arrow Q. This "PES extension fields data" exists in "optional fields" under "PES extension". Incidentally, "PES extension" exists in "optional fields" under "optional PES HEADER" that constitutes a part of the header. Meanwhile, in a case where the second time stamp is inserted into the payload, the second time stamp is inserted into an area of "PES packet data bytes" indicated with an arrow R.

Returning to FIG. 2, the TS formatter 116 transport-packetizes and multiplexes the video stream generated by the video encoder 112, the audio stream generated by the audio encoder 113, and the subtitle stream generated by the subtitle encoder 115, thereby obtaining a transport stream TS as a multiplexed stream. Here, the transport stream TS includes a TS packet that is a container packet obtained by packetizing each of a video stream, an audio stream and a subtitle stream.

Into a header of a TS packet (specific container packet) in which a payload includes a first byte of a subtitle PES packet, the TS formatter 116 inserts first identification information indicating that the payload includes the first byte. As described above, this first identification information further indicates a priority of subtitle displaying based on subtitle information contained in a subtitle packet having the first byte included in the payload of the specific container packet.

Insertion Position of First Identification Information

Here, a specific example of an insertion position of the first identification information will be described. FIG. 9 illustrates a configuration example of a TS packet. The first identification information is inserted into an area of "Transport private data" indicated with an arrow S. This "Transport private data" exists in "optional fields" under "Adaptation field". PVR_assist_information (PVR_assist_information) having the first identification information is arranged in this area of "Transport private data".

FIG. 10(a) shows a structure example (Syntax) of PVR_assist_information (PVR_assist_information); and FIG. 10(b) shows main information contents (Semantics) in the structure example. "data_field_tag", which is an 8-bit field, has a value (for example, 0x08) different from "0x02" indicating being related to displaying of video. "data_field_tag" indicates being related to displaying of a subtitle. "data_field_length", which is an 8-bit field, indicates the number of bytes thereafter as a length (size) of this information.

"PVR_priority_value", which is an 8-bit field, is the above-described first identification information, and indicates a display priority of a subtitle. This display priority is used to determine whether or not to perform decode displaying in relation to a reproduction speed. With the increase in value, the display priority increases, and a degree of displaying becomes larger. It should be noted that the display priority can also be set in such a manner that the display priority increases with the decrease in value.

FIG. 11 shows an example of the relationship of subtitle PES packets with TS packets each having a payload that includes data of the subtitle PES packets. In the example shown in FIG. 11, subtitle PES packets having information of two subtitles, a subtitle 1 and a subtitle 2, are illustrated. The subtitle PES packets are divided into a plurality of pieces, and the pieces are inserted into respective payloads of the TS packets.

"PVR_priority_value" is inserted into a header of a TS packet (specific container packet) in which a payload includes a first byte of a subtitle PES packet. In the example shown in FIG. 11, a value of "PVR_priority_value" that is inserted into the header of the TS packet in which the payload includes the first byte of the subtitle PES packet having information of the subtitle 1 is "N", and a value of "PVR_priority_value" that is inserted into the header of the TS packet in which the payload includes the first byte of the subtitle PES packet having information of the subtitle 2 is "M".

It should be noted that "PID" that exists in the header of the TS packet in which the payload includes data of the subtitle PES packet differs from "PID" that exists in the header of the TS packet in which the payload includes data of the video PES packet, and differs from "PID" that exists in the header of the TS packet in which the payload includes data of the audio PES packet.

Therefore, causing the header to contain information of "PVR_priority_value" enables to easily extract a series of TS packets including data of the subtitle PES packet by extracting the TS packet in which the payload includes the first byte of the subtitle PES packet, and subsequently on the basis of "PID" that exists in the header, by extracting the TS packet in which the payload includes data of the subtitle PES packet.

Returning to FIG. 2, when each stream is multiplexed, the TS formatter 116 arranges a subtitle PES packet at a random access position, that is to say, at a position that is close to a position of the video PES packet targeted for RAP on the basis of the first time stamp (the time stamp inserted into the time stamp insertion position of the header). In addition, at this point of time, the TS formatter 116 arranges the audio PES packet targeted for RAP at a random access position, that is to say, at a position that is close to a position of the video PES packet targeted for RAP on the basis of the management information of the audio PES packet targeted for RAP.

In addition, the TS formatter 116 inserts, into the transport stream TS, second identification information indicating that the first identification information (information of "PVR_priority_value") is inserted into a header of a TS packet (specific container packet) in which a payload includes the first byte of the subtitle PES packet.

In this embodiment, the TS formatter 116 inserts Subtitle_rap_descriptor (Subtitle_rap_descriptor) into a subtitle elementary stream loop corresponding to a subtitle stream under the control of a program map table (PMT: Program Map Table).

FIG. 12(a) shows a structure example (Syntax) of Subtitle_rap_descriptor. FIG. 12(b) shows main information contents (Semantics) in the structure example. "descriptor_tag", which is an 8-bit field, indicates a descriptor type, and is Subtitle_rap_descriptor here. "descriptor_length", which is an 8-bit field, indicates a length (size) of a descriptor, and indicates the number of bytes thereafter as a length of descriptor.

"playback_information_insertion_type", which is a 2-bit field, indicates an insert destination of subtitle display information of PVR trick reproduction. For example, "01" indicates defining in a PES header extension (PES header extension) part. "10" indicates defining in a PES payload (PES payload). "00" indicates defining in transport private data (Transport private data) of a TS adaptation field (TS adaptation field). In this embodiment, "playback_information_insertion_type"="00".

Figure 13:
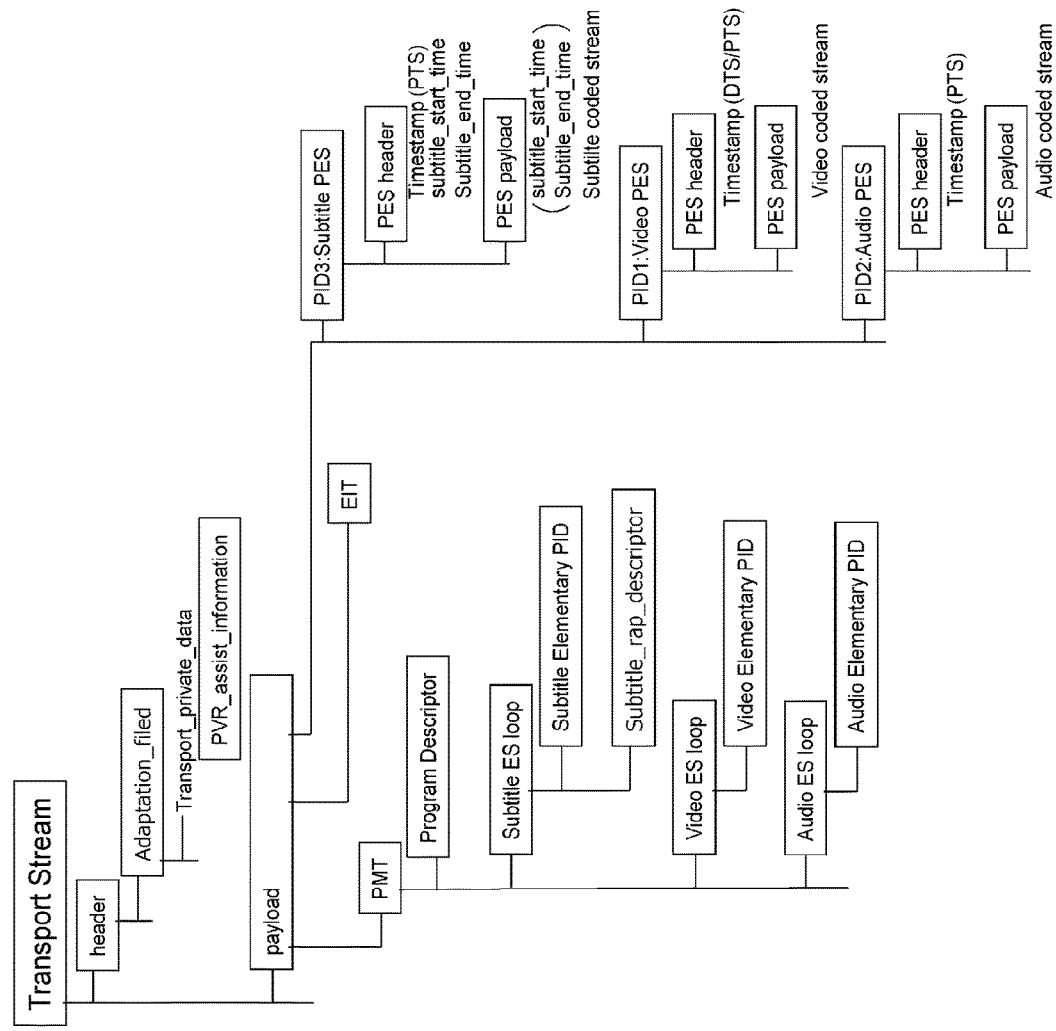
FIG. 13 is a diagram illustrating a configuration example of a transport stream TS.

FIG. 13 illustrates a configuration example of a transport stream TS. In this configuration example, there is a video PES packet "Video PES" that is a PES packet of a video stream identified by PID1. In addition, in this configuration example, there is an audio PES packet "Audio PES" that is a PES packet of an audio stream identified by PID2. Further, in this configuration example, there is a subtitle PES packet "Subtitle PES" that is a PES packet of a subtitle stream identified by PID3.

The PES packet includes a PES header (PES header) and a PES payload (PES payload). In the video PES packet, a time stamp of DTS/PTS is inserted into the PES header, and a video coded stream (coded image data) is inserted into the PES payload. In addition, in the audio PES packet, a time stamp of PTS is inserted into the PES header, and an audio coded stream (coded audio data) is inserted into the PES payload.

In addition, in the subtitle PES packet, a time stamp (first time stamp) of PTS is inserted into the PES header, and a subtitle coded stream (a plurality of subtitle segments as subtitle information) is inserted into the PES payload. Further, the PES header or the PES payload contains a display start time stamp "subtitle_start_time" and a display end time stamp "subtitle_end_time" as the second time stamp (subtitle specific display time stamp).

In addition, in the header of the TS packet (specific container packet) in which a payload includes a first byte of a subtitle PES packet, PVR_assist_information (PVR_assist_information) having first identification information indicating that the payload of this TS packet includes the first byte of the subtitle PES packet is arranged in transport private data (Transport private data) of an adaptation field (adaptation field).

In addition, the transport stream TS includes a Program Map Table (PMT) as Program Specific Information (PSI). This PSI is information indicating to which program each elementary stream included in the transport stream TS belongs. Additionally, the transport stream TS includes an Event Information Table (EIT) as Serviced Information (SI) for performing management on an event basis. Metadata on a program basis is described in this EIT.

The PMT contains a program descriptor (Program Descriptor) that describes information related to the whole program. In addition, this PMT contains elementary stream loops each having information related to each elementary stream. In this configuration example, a video elementary stream loop (Video ES loop), an audio elementary stream loop (Audio ES loop), and a subtitle elementary stream loop (Subtitle ES loop) exist.

Not only information such as a packet identifier (PID) but also a descriptor (descriptor) that describes information related to an elementary stream thereof is arranged in each loop. As one of descriptors, the above-described subtitle_rap_descriptor (Subtitle_rap_descriptor) is arranged in the subtitle elementary stream loop. Second identification information is inserted into this descriptor, the second identification information indicating that the first identification information (information of "PVR_priority_value") is inserted into the header of the TS packet (specific container packet) in which the payload includes the first byte of the subtitle PES packet.

The operation of the stream generation unit 110 shown in FIG. 2 will be briefly described. Image data DV is supplied to the video encoder 112. The video encoder 112 subjects this image data DV to coding, and generates a video stream (PES stream) that includes a video PES packet in which a payload has coded image data. This video stream is supplied to the TS formatter 116.

In addition, audio data DA is supplied to the audio encoder 113. The audio encoder 113 subjects the audio data DA to coding, and generates an audio stream (PES stream) that includes an audio PES packet having coded audio data. This audio stream is supplied to the TS formatter 116.

In addition, text data (character code) DT as subtitle information is supplied to the text-format converter 114. This text-format converter 114 obtains text information of a subtitle that is in a predetermined format, and that has display timing information. Here, the text-format converter 114 obtains TTML. This TTML is supplied to the subtitle encoder 115.

The subtitle encoder 115 converts the TTML into various segments, and generates a subtitle stream that includes a subtitle PES packet having a payload in which those segments are arranged. This subtitle stream is supplied to the TS formatter 116.

When a subtitle stream is generated, under the control of the control unit 111, the subtitle encoder 115 inserts, at a time-stamp insertion position of a header of the subtitle PES packet, a time stamp (first time stamp) having a value that is the same as or close to a value of a time stamp inserted at a time-stamp insertion position of a header of a video PES packet targeted for RAP.

In addition, when a subtitle stream is generated, under the control of the control unit 111, the subtitle encoder 115 inserts a subtitle specific display time stamp (second time stamp) indicating the display time (the display start time, the display end time) of the subtitle into the header or payload of the subtitle PES packet (refer to FIG. 8).

The TS formatter 116 transport-packetizes and multiplexes the video stream generated by the video encoder 112, the audio stream generated by the audio encoder 113, and the subtitle stream generated by the subtitle encoder 115, and thereby generates a transport stream TS as a multiplexed stream. This transport stream TS includes a TS packet that is a container packet obtained by packetizing each of a video stream, an audio stream and a subtitle stream.

In this manner, when each stream is multiplexed, under the control of the control unit 111, the subtitle PES packet is arranged at a random access position, that is to say, at a position that is close to a position of the video PES packet targeted for RAP on the basis of the first time stamp (the time stamp inserted into the time stamp insertion position of the header). In addition, at this point of time, under the control of the control unit 111, the audio PES packet targeted for RAP is arranged at a random access position, that is to say, at a position that is close to a position of the video PES packet targeted for RAP on the basis of the management information of the audio PES packet targeted for RAP.

In addition, into a header of a TS packet (specific container packet) in which a payload includes a first byte of a subtitle PES packet, the TS formatter 116 inserts first identification information indicating that the payload includes the first byte. As described above, this first identification information further indicates a priority of subtitle displaying based on subtitle information contained in the subtitle PES packet having the first byte included in the payload of the specific container packet. In this case, PVR_assist_information (PVR_assist_information) having the first identification information ("PVR_priority_value") is arranged in transport private data (Transport private data) of the adaptation field (adaptation field) (refer to FIGS. 9, 10, 11).

In addition, the TS format 116 inserts, into the transport stream TS, second identification information indicating that the first identification information (information of "PVR_priority_value") is inserted into the header of the TS packet (specific container packet) in which the payload includes the first byte of the subtitle PES packet. In this case, Subtitle_r- ap_descriptor (Subtitle_rap_descriptor) is inserted into the subtitle elementary stream loop corresponding to the subtitle stream under the control of the program map table (PMT: ProgramMap Table) (refer to FIG. 12).

Configuration Example of Television Receiver

Figure 14:
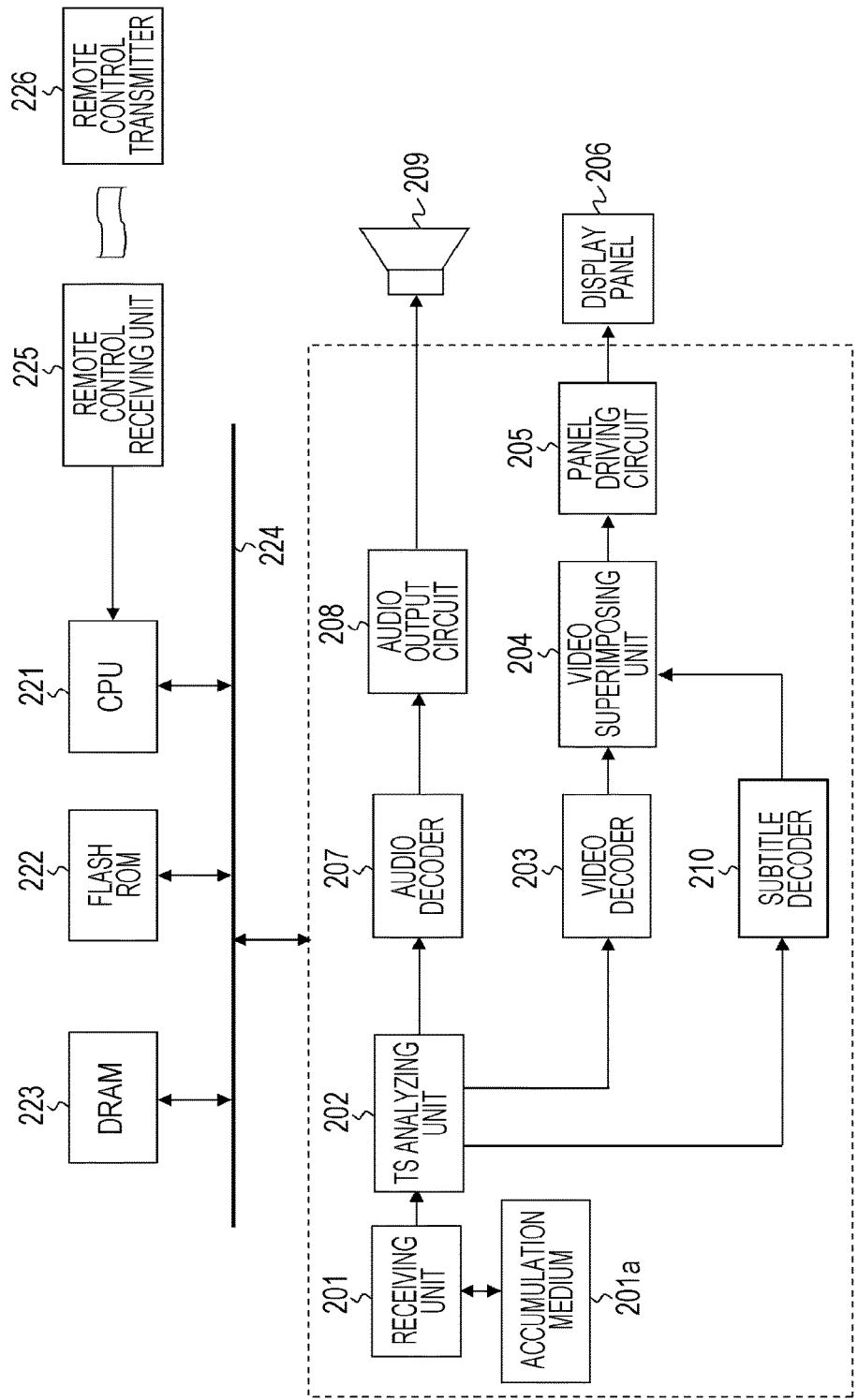
FIG. 14 is a diagram illustrating a configuration example of a television receiver.

FIG. 14 illustrates a configuration example of the television receiver 200. This television receiver 200 includes a receiving unit 201, a TS analyzing unit (demultiplexer) 202, a video decoder 203, a video superimposing unit 204, a panel driving circuit 205, and a display panel 206. In addition, this television receiver 200 includes an audio decoder 207, an audio output circuit 208, a speaker 209, and a subtitle decoder 210. Further, this television receiver 200 includes a CPU 221, a flash ROM 222, a DRAM 223, an internal bus 224, a remote control receiving unit 225, and a remote control transmitter 226.

The CPU 221 controls the operation of each component of the television receiver 200. The flash ROM 222 stores control software, and saves data. The DRAM 223 forms a work area of the CPU 221. The CPU 221 expands, on the DRAM 223, software and data read from the flash ROM 222, starts the software, and controls each component of the television receiver 200.

The remote control receiving unit 225 receives a remote control signal (remote control code) transmitted from the remote control transmitter 226, and supplies the remote control signal to the CPU 221. The CPU 221 controls each component of the television receiver 200 on the basis of this remote control code. The CPU 221, the flash ROM 222 and the DRAM 223 are connected to the internal bus 224.

The receiving unit 201 receives a transport stream TS transmitted from the broadcast delivery system 100 on a broadcast wave. As described above, this transport stream TS includes a video stream, an audio stream and a subtitle stream. The TS analyzing unit 202 extracts, from the transport stream TS, a TS packet that includes data of a PES packet of each of the video, audio, and subtitle streams.

Here, the transport stream TS received by the receiving unit 201 is temporarily accumulated in an accumulation medium (buffer or storage) 201a, and a part corresponding to a reproduction mode is taken out, and is then transmitted to the TS analyzing unit 202. For example, in a normal reproduction mode, all accumulated streams are transmitted to the TS analyzing unit 202. Meanwhile, in a variable-speed reproduction mode, an intermittent part corresponding to the double speed, including apart at a RAP position (random access position), is transmitted to the TS analyzing unit 202. In particular, in an RAP reproduction mode, only the part at the RAP position (random access position) is transmitted to the TS analyzing unit 202.

In addition, the TS analyzing unit 202 extracts various kinds of information inserted into the transport stream TS, and transmits the extracted information to the CPU 221. This information also includes information of Subtitle_rap_descriptor (Subtitle_rap_descriptor). This enables the CPU 221 to easily recognize that a header of a TS packet (specific container packet) in which a payload includes a first byte of a subtitle PES packet has first identification information (information of "PVR_priority_value") inserted therein, the first identification information indicating that the payload includes the first byte.

Additionally, the TS analyzing unit 202 analyzes the various kinds of information inserted into the header of each TS packet, and on the basis of "PID", selectively extracts a TS packet that includes data of each of the video, audio, and subtitle PES packets, thereby obtaining each of the video, audio, and subtitle PES packets.

In this case, causing the header to contain the first identification information (information of "PVR_priority_value") enables the TS analyzing unit 202 to easily extract a series of TS packets including data of the subtitle PES packet by extracting the TS packet in which the payload includes the first byte of the subtitle PES packet, and subsequently on the basis of "PID" that exists in the header, by extracting the TS packet in which the payload includes data of the subtitle PES packet.

The audio decoder 207 subjects an audio PES packet obtained by the TS analyzing unit 202 to decode processing to obtain audio data. The audio output circuit 208 subjects the audio data to required processing such as D/A conversion and amplification, and then supplies the audio data to the speaker 209. The video decoder 203 subjects a video PES packet obtained by the TS analyzing unit 202 to decode processing to obtain image data.

In the normal reproduction mode, decode and output processing for each PES packet in the audio decoder 207 and the video decoder 203 is controlled by the time stamp inserted into the header. However, in the variable-speed reproduction mode, the decode and output processing is not controlled by the time stamp, but is immediately performed after being supplied from the TS analyzing unit 202.

The subtitle decoder 210 subjects a subtitle PES packet obtained by the TS analyzing unit 202 to decode processing, and obtains bitmap data of each region, which should be superimposed on image data. In the normal reproduction mode, decode and output processing for a subtitle PES packet in the subtitle decoder 210 is controlled by the second time stamp (subtitle specific display time stamp) inserted into the header or the payload. However, in the variable-speed reproduction mode, the decode and output processing is not controlled by the second time stamp, but is immediately performed after being supplied from the TS analyzing unit 202.

Figure 15:
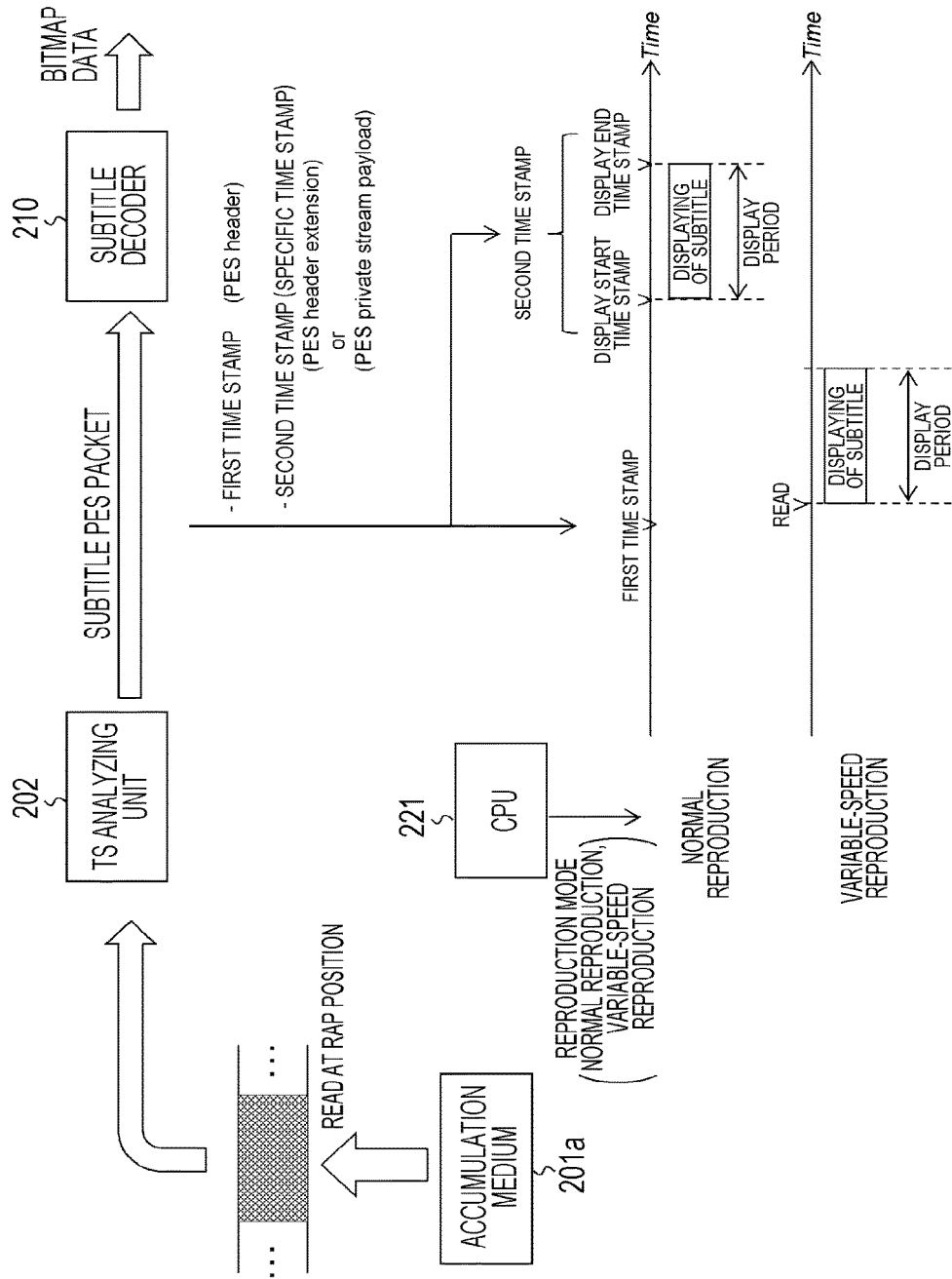
FIG. 15 is a diagram schematically illustrating the processing timing of decoding and outputting a subtitle PES packet read at a Random Access Point (RAP) position.

FIG. 15 schematically illustrates the processing timing of decoding and outputting a subtitle PES packet read at, for example, an RAP position. In the case of the normal reproduction mode, decoding is completed until the time indicated by the display start time stamp, outputting of bitmap data as the result of decoding is started from the aforementioned time, and is continued up to the time indicated by the display end time stamp. In this case, a period from the time indicated by the display start time stamp and up to the time indicated by the display end time stamp is a subtitle display period.

Meanwhile, in the case of the variable-speed reproduction mode, decoding is immediately performed after reading from the accumulation medium 201a, and outputting of bitmap data as the result of decoding is started. The duration of this output becomes a subtitle display period. The duration of this output is, for example, a time period from the relative start time "begin" up to the relative end time "end" included in TTML body (which is the same as the time period from the time indicated by the display start time stamp up to the time indicated by the display end time stamp described above).

In this variable-speed reproduction mode, in the case of N×speed (N>1), display periods of a plurality of subtitles may overlap each other. With the increase in N×speed, there is a higher probability that an overlapped time period will occur. On the basis of information such as an interval between start times of subtitles, and display periods of the subtitles, which are determined according to N×speed, the CPU 221 is capable of determining whether or not the display periods of the subtitles will overlap each other.

When display periods of a plurality of subtitles overlap each other, the CPU 221 makes a selection, on the basis of priority information (information of "PVR_priority_value") of subtitle displaying, as to which subtitle to be displayed, and controls the TS analyzing unit 202 and the subtitle decoder 210 in such a manner that only the result of decoding (bitmap data) of the selected subtitle is output.

Figure 16:
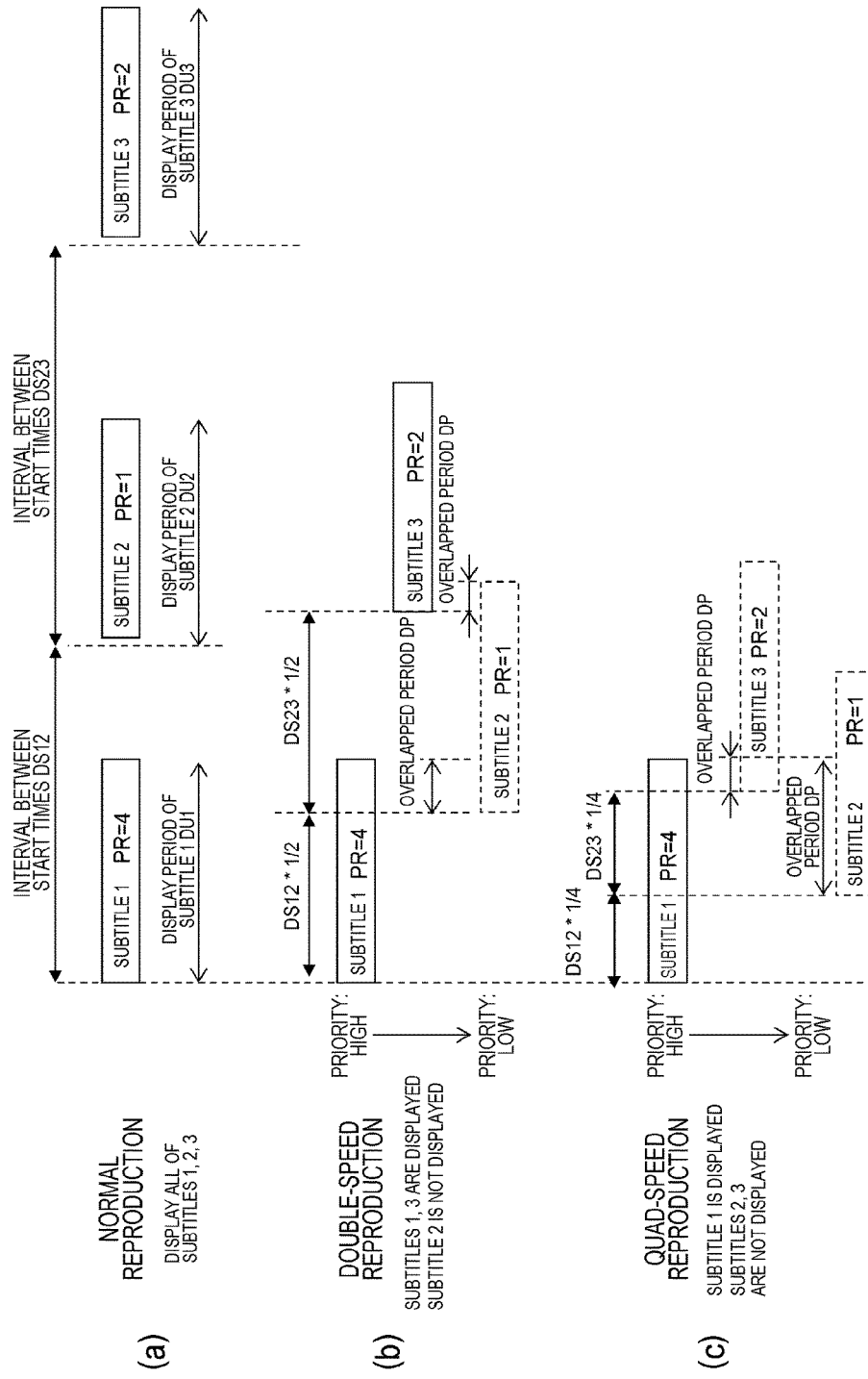
FIG. 16 is a diagram illustrating, as an example, subtitle display sequences in a variable-speed reproduction mode.

FIG. 16 illustrates an example of a subtitle display sequence in the variable-speed reproduction mode. Here, it is assumed that corresponding to subtitles 1, 2, 3, values of "PVR_priority_value" are set at "4", "1", "2" respectively as shown in, for example, FIG. 17(a). As shown in FIG. 17(b), the television receiver 200 operates in such a manner that when "PVR_priority_value"="4", displaying is performed at any of normal speed, double-speed, and quad-speed, when "PVR_priority_value"="2", displaying is performed only at normal speed and double-speed, and when "PVR_priority_value"="1", displaying is performed only at normal speed.

FIG. 16(a) illustrates, as an example, a case of normal reproduction. Display periods of subtitles 1, 2, 3 are DU1, DU2, DU3 respectively. An interval between start times of the subtitle 1 and the subtitle 2 is DS12, and is longer than the display period DU1 of the subtitle 1. In addition, an interval between start times of the subtitle 2 and the subtitle 3 is DS23, and is longer than the display period DU2 of the subtitle 2. In the case of this normal reproduction, all of the subtitles 1, 2, 3 are displayed. In this case, the TS analyzing unit 202 selectively processes TS packets including data of subtitle PES packets corresponding to all of "4", "2", "1" as "PVR_priority_value", obtains subtitle PES packets related to all of the subtitles 1, 2, 3, and transmits the subtitle PES packets to the subtitle decoder 210.

FIG. 16(b) illustrates, as an example, a case of double-speed reproduction. An interval between start times of the subtitle 1 and the subtitle 2 becomes DS12*½. Therefore, display periods of the subtitles 1 and 2 produce an overlapped period DP. In addition, an interval between start times of the subtitle 2 and the subtitle 3 becomes DS23*½ Therefore, display periods of the subtitles 2 and 3 produce an overlapped period DP.

In this case, the subtitle 1 having a higher priority is selected, from between the subtitle 1 and the subtitle 2, as a subtitle to be displayed, and the subtitle 3 is further selected as a subtitle to be displayed. In other words, in the case of this double-speed reproduction, the subtitles 1, 3 are displayed, and the subtitle 2 is not displayed. In this case, the TS analyzing unit 202 selectively processes TS packets including data of subtitle PES packets corresponding to "4" and "2" as "PVR_priority_value", obtains subtitle PES packets related to the subtitles 1 and 2, and transmits the subtitle PES packets to the subtitle decoder 210.

FIG. 16(c) illustrates, as an example, a case of quad-speed reproduction. An interval between start times of the subtitle 1 and the subtitle 2 becomes DS12*¼. In addition, an interval between start times of the subtitle 2 and the subtitle 3 becomes DS23*¼. Therefore, display periods of the subtitles 1 and 2 produce an overlapped period DP. Moreover, display periods of the subtitles 1 and 3 also produce an overlapped period DP. In this case, the subtitle 1 having the highest priority is selected, from among the subtitles 1, 2, 3, as a subtitle to be displayed. In other words, in the case of this quad-speed reproduction, the subtitle 1 is displayed, and the subtitles 2 and 3 are not displayed. In this case, the TS analyzing unit 202 selectively processes TS packets including data of subtitle PES packets corresponding to "4" as "PVR_priority_value", obtains subtitle PES packets related to the subtitle 1, and transmits the subtitle PES packets to the subtitle decoder 210.

Returning to FIG. 14, the video superimposing unit 204 superimposes bitmap data of each region obtained from the subtitle decoder 210 on image data obtained by the video decoder 203. The panel driving circuit 205 drives the display panel 206 on the basis of image data for displaying obtained by the video superimposing unit 204. The display panel 206 includes, for example, a Liquid Crystal Display (LCD), and an organic electroluminescence display (organic EL display).

The operation of the television receiver 200 shown in FIG. 14 will be briefly described. The receiving unit 201 receives a transport stream TS transmitted from the broadcast delivery system 100 on a broadcast wave. This transport stream TS includes a video stream, an audio stream and a subtitle stream.

This transport stream TS is supplied to the TS analyzing unit 202 through the accumulation medium 201a. In this case, a part corresponding to a reproduction mode is taken out, and is then transmitted to the TS analyzing unit 202. For example, in a normal reproduction mode, all accumulated streams are transmitted to the TS analyzing unit 202. Meanwhile, in a variable-speed reproduction mode, an intermittent part corresponding to the double speed, including a part at a RAP position (random access position), is transmitted to the TS analyzing unit 202. In particular, in an RAP reproduction mode, only the part at the RAP position (random access position) is transmitted to the TS analyzing unit 202.

The video PES packet extracted by the TS analyzing unit 202 is supplied to the video decoder 203. The video decoder 203 subjects the video PES packet extracted by the TS analyzing unit 202 to decode processing to obtain image data. In the normal reproduction mode, decode and output processing for each video PES packet is controlled by the time stamp inserted into the header. However, in the variable-speed reproduction mode, the decode and output processing is not controlled by the time stamp, but is immediately performed after being supplied from the TS analyzing unit 202. This image data is supplied to the video superimposing unit 204.

In addition, the subtitle stream (PES stream) extracted by the TS analyzing unit 202 is supplied to the subtitle decoder 210. The subtitle decoder 210 processes segment data of each region to obtain bitmap data of each region, which should be superimposed on image data. In the normal reproduction mode, decode and output processing for each subtitle PES packet is controlled by the second time stamp (specific time stamp) inserted into the header or the payload. However, in the variable-speed reproduction mode, the decode and output processing is not controlled by the second time stamp, but is immediately performed after being supplied from the TS analyzing unit 202 (refer to FIG. 15).

In addition, in the variable-speed reproduction mode, in the case of N×speed (N>1), display periods of a plurality of subtitles may overlap each other. On the basis of information such as an interval between start times of subtitles, and display periods of the subtitles, which are determined according to N×speed, the CPU 221 is capable of determining whether or not the display periods of the subtitles will overlap each other. When display periods of a plurality of subtitles overlap each other, the CPU 221 makes a selection, on the basis of priority information of subtitle displaying, as to which subtitle to be displayed, and controls the TS analyzing unit 202 and the subtitle decoder 210 in such a manner that only the result of decoding (bitmap data) of the selected subtitle is output (refer to FIG. 16).

The bitmap data of each region, which is output from the subtitle decoder 210, is supplied to the video superimposing unit 204. The video superimposing unit 204 superimposes the bitmap data of each region, which is output from the subtitle decoder 210, on the image data obtained by the video decoder 203.

The image data for displaying obtained by the video superimposing unit 204 is supplied to the panel driving circuit 205. The panel driving circuit 205 drives the display panel 206 on the basis of the video data for displaying. As the result, the display panel 206 displays an image on which the subtitle is superimposed. In this case, in the normal reproduction mode, a normal reproduction image is displayed at normal speed; and in the variable-speed reproduction mode, a variable-speed reproduction image corresponding to N×speed is displayed.

In addition, the audio PES packet extracted by the TS analyzing unit 202 is supplied to the audio decoder 207. The audio decoder 207 subjects the audio PES packet to decode processing to obtain audio data. In the normal reproduction mode, decode and output processing for each audio PES packet is controlled by the time stamp inserted into the header. However, in the variable-speed reproduction mode, the decode and output processing is not controlled by the time stamp, but is immediately performed after being supplied from the TS analyzing unit 202.

This audio data is supplied to the audio output circuit 208. The audio output circuit 208 subjects the audio data to required processing such as D/A conversion and amplification. Subsequently, the audio data after the processing is supplied to the speaker 209. As the result, audio output corresponding to the image displayed on the display panel 206 is obtained from the speaker 209.

As described above, in the transmitting and receiving system 10 shown in FIG. 1, a header of a TS packet (specific container packet) in which a payload includes a first byte of the subtitle PES packet has first identification information (information of "PVR_priority_value") inserted therein, the first identification information indicating that the payload includes the first byte. Therefore, for example, at the time of RAP reproduction, the TS packet in which the payload includes the first byte of the subtitle PES packet can be easily recognized on the basis of this first identification information. Therefore, a series of TS packets (container packet) including data of the subtitle PES packet can be efficiently extracted, which enables to satisfactorily display the subtitle.

In addition, in the transmitting and receiving system 10 shown FIG. 1, into a header of a TS packet (specific container packet) in which a payload includes a first byte of a subtitle PES packet, priority information (information of "PVR_priority_value") of subtitle displaying based on subtitle information contained in the subtitle PES packet having this first byte is inserted. Therefore, for example, at the time of variable-speed reproduction, referring to the priority information, a subtitle to be displayed can be selected according to the reproduction speed. This enables to easily select a subtitle to be displayed, and to satisfactorily display the subtitle on which intention on the producer side is reflected.

Additionally, in the transmitting and receiving system 10 shown FIG. 1, when a transport stream TS as a multiplexed stream is generated on the transmission side, a subtitle PES packet is arranged at a random access position. Therefore, on the receiving side, when a video PES packet at a random access position is taken out from a multiplexed stream, a subtitle PES packet can be taken out together, and therefore subtitle display processing in the variable-speed reproduction mode is made simple.

Figure 18:
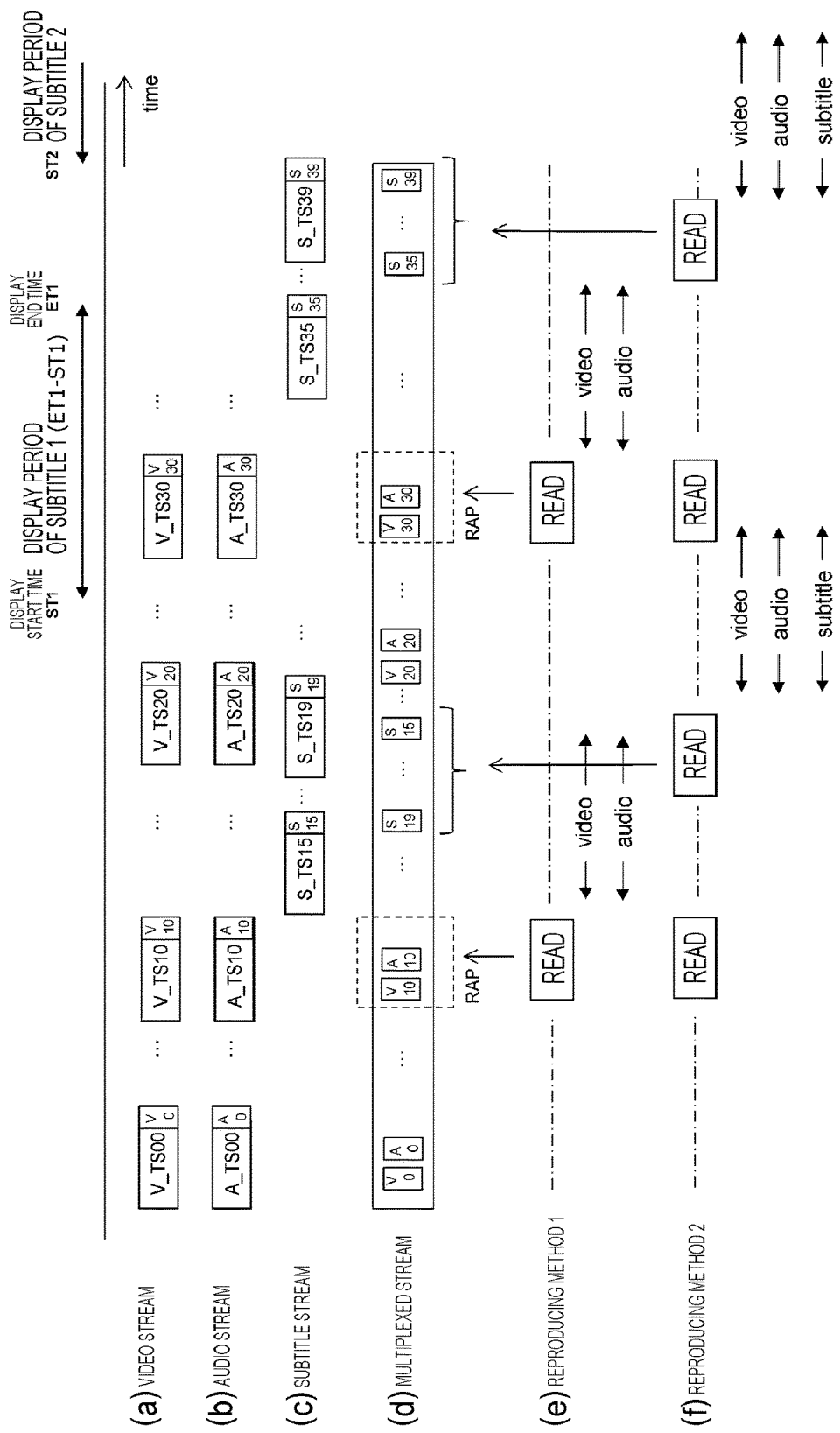
FIG. 18 is a diagram illustrating multiplexing in the prior art.

For example, FIG. 18 illustrates multiplexing in the prior art. FIG. 18(a) illustrates a video PES packet train constituting a video stream. "V_TS00", "V_TS10", "V_TS20", "V_TS30", . . . indicate time stamps inserted into headers, and "V0", "V10", "V20", "V30", . . . indicate coded image data arranged in payloads.

FIG. 18(b) illustrates an audio PES packet train constituting an audio stream. "A_TS00", "A_TS10", "A_TS20", "A_TS30", . . . indicate time stamps inserted into headers, and "A0", "A10", "A20", "A30", . . . indicate coded audio data arranged in payloads.

FIG. 18(c) illustrates a subtitle PES packet train constituting a subtitle stream. "S_TS15", "S_TS19", "S_TS35", "A_TS39", . . . indicate time stamps inserted into headers, and "S15", "S19", "S35", "S39", . . . indicate subtitle information arranged in payloads. A time stamp is inserted into the header of the subtitle PES packet irrespective of the time stamps inserted into the header of the video PES packet and the header of the audio PES packet.

FIG. 18(d) illustrates an example of arrangement of each PES packet in a multiplexed stream (transport stream TS). At the time of multiplexing, a time stamp inserted into the header of each PES packet is referred to, thereby determining the arrangement of the each PES packet. In this case, the subtitle PES packet is arranged at a position slightly before a display period irrespective of RAP positions (random access position).

At the time of RAP reproduction, as shown in, for example, a reproducing method 1 of FIG. 18(e), a PES packet is read at every RAP position so as to have a certain degree of length, is subjected to decode processing, and image displaying and audio outputting are then performed. In this case, a subtitle PES packet is not always arranged at an RAP position, and therefore a subtitle is not displayed.

Incidentally, even in the case of this RAP reproduction, in order to perform subtitle displaying, it is considered that not only reading of the RAP position but also reading of the subtitle PES packet is performed as shown in a reproducing method 2 of FIG. 18(f). In this case, it is necessary to repeat not only a jump for reading an RAP position but also a jump for reading a subtitle PES packet, which causes reproduction processing to become complicated. In addition, image displaying and audio outputting are forced to wait until a subtitle PES packet is read, which causes a delay in image displaying and audio outputting.

Figure 19:
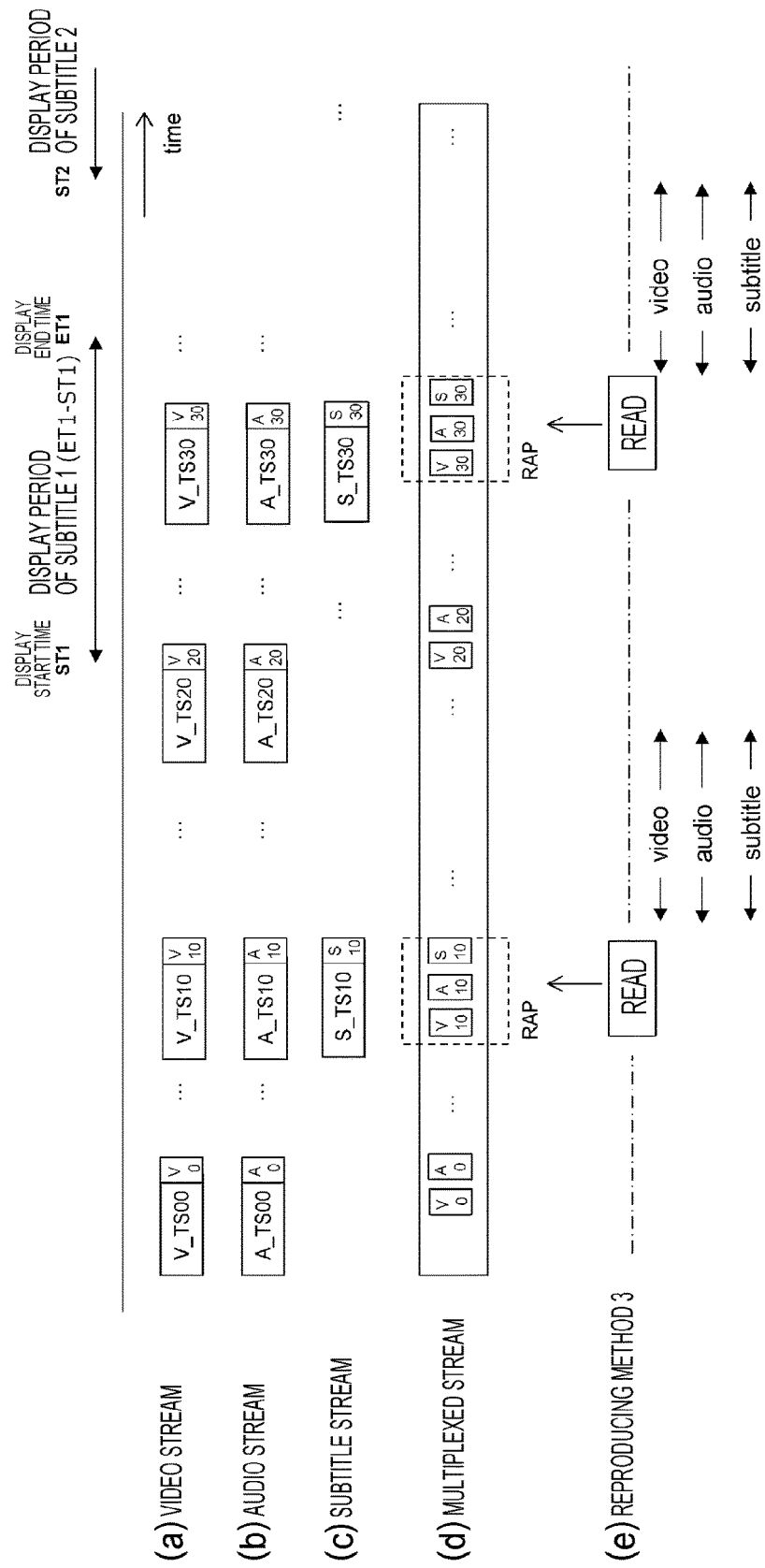
FIG. 19 is a diagram illustrating multiplexing according to the present technology.

FIG. 19 shows multiplexing according to the present technology. FIG. 19(a) illustrates a video PES packet train constituting a video stream. "V_TS00", "V_TS10", "V_TS20", "V_TS30", . . . indicate time stamps inserted into headers, and "V0", "V10", "V20", "V30", . . . indicate coded image data arranged in payloads.

FIG. 19(b) illustrates an audio PES packet train constituting an audio stream. "A_TS00", "A_TS10", "A_TS20", "A_TS30", . . . indicate time stamps inserted into headers, and "A0", "A10", "A20", "A30", . . . indicate coded image data arranged in payloads.

FIG. 19(c) illustrates a subtitle PES packet train constituting a subtitle stream. "S_TS10", "S_TS30", . . . indicate time stamps inserted into headers, and "S10", "S130", . . . indicates subtitle information arranged in payloads. A time stamp (first time stamp) having a value that is the same as or close to a value of a time stamp inserted into the header of the video PES packet targeted for RAP is inserted into the header of the subtitle PES packet.

FIG. 19(d) illustrates an example of arrangement of each PES packet in a multiplexed stream (transport stream TS). At the time of multiplexing, a time stamp inserted into the header of each PES packet is referred to, thereby determining the arrangement of the each PES packet. In this case, as with the video PES packet and the audio PES packet, which are targeted for RAP, the subtitle PES packet is arranged at an RAP position (random access position).

At the time of RAP reproduction, as shown in, for example, a reproducing method 3 of FIG. 19(e), a PES packet is read at every RAP position so as to have a certain degree of length, and is then subjected to decode processing. In this case, the subtitle PES packet is also read and subjected to decode processing together with the video PES packet and the audio PES packet. Therefore, subtitle displaying is also satisfactorily performed together with image displaying and audio outputting.

Performing multiplexing in this manner as presented in the present technology eliminates the need for repeating not only a jump for reading an RAP position, but also a jump for reading a subtitle PES packet, such as that performed by the reproducing method 2 shown in FIG. 19(f). Therefore, variable-speed reproduction processing on the receiving side, which enables subtitle displaying, is simplified.

In addition, in the transmitting and receiving system 10 shown FIG. 1, the second time stamp (subtitle specific display time stamp) indicating the display time of the subtitle is inserted into the header or payload of the subtitle PES packet. Therefore, on the receiving side, the display timing of the subtitle can be easily controlled on the basis of this subtitle specific display time stamp.

Further, in the transmitting and receiving system 10 shown in FIG. 1, the transport TS as the multiplexed stream has second identification information inserted therein, the second identification information indicating that a header of a TS packet (specific container packet) in which a payload includes a first byte of the subtitle packet has first identification information (information of "PVR_priority_value") inserted therein, the first identification information indicating that the payload includes the first byte. This enables to easily determine, on the receiving side, that the first identification information is inserted into the header of the specific container packet.

2. Modified Example

Incidentally, the above-described embodiment shows an example in which as shown in FIGS. 5(a), 5(b), 5(c), each body has information of one subtitle, and subtitle PES packets that include information of bodies respectively are generated and transmitted. However, as shown in FIG. 20, an example in which a body has information of a plurality of subtitles is also considered. In addition, it is also considered that a subtitle PES packet that includes information of this body is generated and transmitted.

FIG. 21(a) shows a structure example (Syntax) of PVR_assist_information (PVR_assist_information) for that case; and FIG. 21(b) shows main information contents (Semantics) in the structure example. "data_field_tag", which is an 8-bit field, has a value (for example, 0x08) different from "0x02" indicating being related to displaying of video. "data_field_tag" indicates being related to displaying of a subtitle. "data_field_length", which is an 8-bit field, indicates the number of bytes thereafter as a length (size) of this information.

"number_of_subtitles", which is an 8-bit field, indicates the number of subtitles. In addition, there are "xml_id" 8-bit fields, the number of which is equivalent to the number of subtitles, and "PVR_priority_value" 8-bit fields, the number of which is equivalent to the number of subtitles. The "xml_id" field indicates an ID of a subtitle. The "PVR_priority_value" field indicates a display priority of the subtitle.

According to the structure example of PVR_assist_information shown in FIG. 21(a), a subtitle PES packet includes a plurality of pieces of subtitle information, and thus a display priority for each subtitle can be given to the receiving side. It should be noted that even in the case where the subtitle PES packet includes the plurality of pieces of subtitle information, if it is assumed that all of those display priorities are the same, the structure example of PVR_assist_information can be substituted by the structure example shown in FIG. 10.

In addition, in a case where a plurality of subtitles differ in the display timing as shown in FIG. 20, for example, the relative start time "begin" and the relative end time "end" of a subtitle having the earliest display timing are subjected to time-stamp accuracy conversion, thereby obtaining a display start time stamp and a display end time stamp as the above-described second time stamp.

In this case, on the receiving side, with respect to the display control of the subtitle having the earliest display timing, the display start time stamp and the display end time stamp as the above-described second time stamp are used. In addition, with respect to the display control of a subsequent subtitle, a display time stamp (display start time stamp, display end time stamp) that is subjected to time-stamp accuracy conversion on the basis of a difference from the relative time of a subtitle having the earliest display timing supplied in a TTML body is generated and used.

In addition, the above-described embodiment shows an example in which when a transport stream TS as a multiplexed stream is generated on the transmission side, a subtitle PES packet is arranged at a random access position. However, even in a case where the subtitle PES packet is not arranged at a random access position in this manner, it is possible to apply the technique in which a header of a TS packet (specific container packet) in which a payload includes a first byte of the subtitle packet has first identification information (priority information) inserted therein, the first identification information indicating that the payload includes the first byte.

Additionally, the above-described embodiment has shown an example in which TTML is used as text information of a subtitle that is in a predetermined format, and that has display timing information. However, the present technology is not limited to this. It is also considered that other timed text information having information equivalent to TTML is used. For example, TTML derived format may be used. Moreover, it is natural that even if a subtitle format is a conventional type bit map system, the present technology can be similarly applied.

Further, although the transmitting and receiving system 10 that includes the broadcast delivery system 100 and the television receiver 200 has been presented in the above-described embodiment, the configuration of the transmitting and receiving system to which the present technology can be applied is not limited to this. For example, the part of the television receiver 200 may have a configuration that includes a monitor, and a set-top box connected to a digital interface such as HDMI (High-Definition Multimedia Interface). It should be noted that "HDMI" is a registered trademark.

Furthermore, the above-described embodiment has shown an example in which the multiplexed stream is an MPEG-2 transport stream. It is natural that even in a case where a multiplexed stream is an MMT stream, a DASH/ISOBMFF stream or the like, the present technology can be similarly applied.

In addition, the present technology can also have configurations such as that described below.

(1) A transmission device including:
a video encoding unit for generating a video stream that includes a video packet in which a payload has coded image data;
a subtitle encoding unit for generating a subtitle stream that includes a subtitle packet in which a payload has subtitle information;
a multiplexed stream generation unit for generating a multiplexed stream that includes a container packet obtained by packetizing the video stream and the subtitle stream;
a transmission unit for transmitting the multiplexed stream; and
an information insertion unit for inserting, into a header of a specific container packet in which a payload includes a first byte of the subtitle packet, first identification information indicating that the payload includes the first byte.

(2) The transmission device set forth in the preceding (1), in which
the first identification information further indicates a priority of subtitle displaying based on the subtitle information contained in the subtitle packet having the first byte included in the payload of the specific container packet.

(3) The transmission device set forth in the preceding (1) or (2), further including
an information insertion unit for inserting, into the multiplexed stream, second identification information indicating that the first identification information is inserted into the header of the specific container packet.

(4) The transmission device set forth in any of the preceding (1) to (3), in which
the multiplexed stream generation unit arranges the subtitle packet at a random access position.

(5) The transmission device set forth in any of the preceding (1) to (4), in which
the multiplexed stream is an MPEG-2 transport stream, an MMT stream or a DASH/ISOBMFF stream.

(6) A transmission method including:
a video encoding step for generating a video stream that includes a video packet in which a payload has coded image data;
a subtitle encoding step for generating a subtitle stream that includes a subtitle packet in which a payload has subtitle information;
a multiplexed stream generation step for generating a multiplexed stream that includes a container packet obtained by packetizing the video stream and the subtitle stream;
a transmission step for transmitting the multiplexed stream by the transmission unit; and
an information insertion step for inserting, into a header of a specific container packet in which a payload includes a first byte of the subtitle packet, first identification information indicating that the payload includes the first byte.

(7) A reproducing device including
a reproduction processing unit for subjecting, to reproduction processing, a multiplexed stream that includes a container packet obtained by packetizing a video stream that includes a video packet in which a payload has coded image data, and a subtitle stream that includes a subtitle packet in which a payload has subtitle information,
in which:
into a header of a specific container packet in which a payload includes a first byte of the subtitle packet, first identification information indicating that the payload includes the first byte is inserted; and
the reproduction processing unit extracts the specific container packet from the multiplexed stream on the basis of the first identification information.

(8) The reproducing device set forth in the preceding (7), in which:
the first identification information further indicates a priority of subtitle displaying based on the subtitle information contained in the subtitle packet having the first byte included in the payload of the specific container packet; and
when the multiplexed stream is subjected to variable-speed reproduction processing, the reproduction processing unit controls, on the basis of the priority information, subtitle displaying based on subtitle information contained in each subtitle packet.

(9) A reproducing method including
a reproduction processing step for subjecting, to reproduction processing, a multiplexed stream that includes a container packet obtained by packetizing a video stream that includes a video packet in which a payload has coded image data, and a subtitle stream that includes a subtitle packet in which a payload has subtitle information, by a reproduction processing unit,
in which:
into a header of a specific container packet in which a payload includes a first byte of the subtitle packet, first identification information indicating that the payload includes the first byte is inserted; and
in the reproduction processing step, the specific container packet is extracted from the multiplexed stream on the basis of the first identification information.

(10) A transmission device including:
a video encoding unit for generating a video stream that includes a video packet in which a payload has coded image data;
a subtitle encoding unit for generating a subtitle stream that includes a subtitle packet in which a payload has subtitle information;
a multiplexed stream generation unit for generating a multiplexed stream that includes a container packet obtained by packetizing the video stream and the subtitle stream;
a transmission unit for transmitting the multiplexed stream; and
an information insertion unit for inserting, into a header of a specific container packet in which a payload includes a first byte of the subtitle packet, priority information of subtitle displaying based on the subtitle information contained in the subtitle packet having the first byte.

A main feature of the present technology is that by inserting, into a header of a TS packet (specific container packet) in which a payload includes a first byte of a subtitle PES packet, first identification information indicating that the payload includes the first byte, a series of TS packets (container packets) including data of the subtitle PES packet can be efficiently extracted, for example, at the time of RAP reproduction, and that by configuring the first identification information to indicate a priority of subtitle displaying, a subtitle to be displayed can be easily selected, for example, at the time of variable-speed reproduction (refer to FIG. 11).

REFERENCE SIGNS LIST

10 Transmitting and receiving system
100 Broadcast delivery system

110 Stream generation unit
111 Control unit
112 Video encoder
113 Audio encoder
114 Text-format converter
115 Subtitle encoder
116 TS formatter
120 Timing management unit
121 Video timing management unit
122 Audio timing management unit
123 RAP timing management unit
124 Subtitle display timing management unit
200 Television receiver
201 Receiving unit
201a Accumulation medium
202 TS analyzing unit
203 Video decoder
204 Video superimposing unit
205 Panel driving circuit
206 Display panel
207 Audio decoder
208 Audio output circuit
209 Speaker
210 Subtitle decoder
221 CPU

The invention claimed is:

1. A transmission device comprising:
processing circuitry configured to
generate a video stream that includes a video packet in which a payload has coded image data,
generate a subtitle stream that includes a subtitle packet in which a payload has subtitle information,
generate a multiplexed stream that includes a transport packet obtained by packetizing the video stream and the subtitle stream, and
insert, into a header of the transport packet, first identification information indicating that a payload of the transport packet includes a first byte of the subtitle packet; and
a transmitter configured to transmit the multiplexed stream.

2. The transmission device according to claim 1, wherein the first identification information further indicates a priority of subtitle displaying based on the subtitle information contained in the subtitle packet having the first byte included in the payload of the transport packet.

3. The transmission device according to claim 1, wherein the processing circuitry is further configured to
insert, into the multiplexed stream, second identification information indicating that the first identification information is inserted into the header of the transport packet.

4. The transmission device according to claim 1, wherein the processing circuitry is further configured to
arrange the subtitle packet at a random access position.

5. The transmission device according to claim 1, wherein the multiplexed stream is an MPEG-2 transport stream, an MMT stream or a DASH/ISOBMFF stream.

6. The transmission device of claim 1, wherein the first identification information is inserted into an area including transport private data of the transport packet.

7. A transmission method comprising:
generating a video stream that includes a video packet in which a payload has coded image data;
generating a subtitle stream that includes a subtitle packet in which a payload has subtitle information;
generating a multiplexed stream that includes a transport packet obtained by packetizing the video stream and the subtitle stream;
inserting, into the header of the transport packet, first identification information indicating that a payload of the transport packet includes a first byte of the subtitle packet; and
transmitting the multiplexed stream by a transmitter.

8. A reproducing device comprising:
processing circuitry configured to
process a multiplexed stream that includes a transport packet obtained by packetizing a video stream that includes a video packet in which a payload has coded image data, and a subtitle stream that includes a subtitle packet in which a payload has subtitle information, wherein first identification information indicating that a payload of the transport packet includes a first byte of the subtitle packet is inserted into a header of the transport packet; and
extract the transport packet from the multiplexed stream based on the first identification information.

9. The reproducing device according to claim 8, wherein:
the first identification information further indicates a priority of subtitle displaying based on the subtitle information contained in the subtitle packet having the first byte included in the payload of the transport packet; and
the processing circuitry is further configured to control based on the priority information, subtitle displaying based on subtitle information contained in each subtitle packet when the multiplexed stream is subjected to variable-speed reproduction processing.

10. A reproducing method comprising
processing a multiplexed stream that includes a transport packet obtained by packetizing a video stream that includes a video packet in which a payload has coded image data, and a subtitle stream that includes a subtitle packet in which a payload has subtitle information, by processing circuitry, wherein first identification information indicating that a payload of the transport packet includes a first byte of the subtitle packet is inserted into a header of the transport packet; and
extracting the transport packet from the multiplexed stream based on the first identification information.

11. A transmission device comprising:
generating a video stream that includes a video packet in which a payload has coded image data;
generating a subtitle stream that includes a subtitle packet in which a payload has subtitle information;
generating a multiplexed stream that includes a container packet obtained by packetizing the video stream and the subtitle stream;
inserting, into a header of a transport packet in which a payload includes a first byte of the subtitle packet priority information of subtitle displaying based on the subtitle information contained in the subtitle packet having the first byte; and
transmitting the multiplexed stream by a transmitter.

* * * * *